United States Patent
Hippargi et al.

(10) Patent No.: US 10,424,331 B1
(45) Date of Patent: Sep. 24, 2019

(54) REMOTELY CONTROLLING A MAGNETIC TAPE CARTRIDGE

(71) Applicant: International Business Machines Corporation, Armonk, NY (US)

(72) Inventors: Aravind Hippargi, Rajajinagar (IN); Frank Krick, Ockenheim (DE); Christian Mueller, Dichtelbach (DE); Bernd Freitag, Partenheim (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/985,426

(22) Filed: May 21, 2018

(51) Int. Cl.
*G11B 23/02* (2006.01)
*G11B 15/02* (2006.01)
(Continued)

(52) U.S. Cl.
CPC ........ *G11B 15/023* (2013.01); *G11B 5/00813* (2013.01); *G11B 15/106* (2013.01);
(Continued)

(58) Field of Classification Search
None
See application file for complete search history.

(56) References Cited

U.S. PATENT DOCUMENTS 5,016,123 A * 5/1991 Karsh ................. G11B 15/07
360/132
6,351,685 B1 * 2/2002 Dimitri ................ G11B 15/689
414/273
(Continued)

FOREIGN PATENT DOCUMENTS

EP  2109105 A1  10/2009
GB  2406960 A  *  4/2005  ............. G11B 15/68
(Continued)

OTHER PUBLICATIONS

"Magnetically Actuated File Protect," Jun. 1, 1972, IBM Technical Disclosure Bulletin, vol. No. 15, Iss. No. 1, pp. 116-117. (Year: 1972).*

(Continued)

*Primary Examiner* — William J Klimowicz
(74) *Attorney, Agent, or Firm* — Zilka-Kotab, PC

(57) ABSTRACT

A data storage cartridge according to one embodiment comprises a housing configured to house a data storage medium, a sensor coupled to the housing, and a microcontroller coupled to the sensor. The microcontroller is configured to wirelessly communicate information about the sensor. Other embodiments relate to a data storage cartridge comprising a housing configured to house a data storage medium, a cartridge memory coupled to the housing, the cartridge memory having a wireless communications interface, and a microcontroller in physical communication with the cartridge memory. The microcontroller is configured to wirelessly communicate information retrieved from the cartridge memory. Additional embodiments relate to a data storage cartridge comprising a mechanical write protect mechanism coupled to the housing of the data storage cartridge, an actuator coupled to the mechanical write protect mechanism for selectively changing a state of the mechanical write protect mechanism, and a microcontroller configured to control the actuator.

8 Claims, 14 Drawing Sheets

(51) Int. Cl.
    *G11B 33/04*     (2006.01)
    *G11B 15/10*     (2006.01)
    *G11B 5/008*     (2006.01)
    *G11B 23/04*     (2006.01)
    *G11B 23/03*     (2006.01)
    *G11B 23/087*     (2006.01)
    *G11B 15/07*     (2006.01)

(52) U.S. Cl.
    CPC ...... *G11B 23/0302* (2013.01); *G11B 23/0303* (2013.01); *G11B 23/041* (2013.01); *G11B 23/042* (2013.01); *G11B 23/08714* (2013.01); *G11B 33/04* (2013.01); *G11B 15/07* (2013.01)

(56) References Cited

U.S. PATENT DOCUMENTS

| | | | |
|---|---|---|---|
| 6,710,962 B1* | 3/2004 | Caverly | G11B 15/6835 360/69 |
| 6,739,536 B2 | 5/2004 | Nunn et al. | |
| 6,755,367 B2 | 6/2004 | Childers et al. | |
| 7,650,461 B2* | 1/2010 | Dahman | G11B 15/07 711/111 |
| 7,885,037 B2* | 2/2011 | Konshak | G11B 15/6835 360/133 |
| 8,035,482 B2* | 10/2011 | Kerr | G06K 19/04 340/10.1 |
| 8,060,893 B2* | 11/2011 | Georgis | G11B 23/0303 720/600 |
| 8,194,349 B2* | 6/2012 | Sato | G11B 23/041 360/132 |
| 8,767,330 B2 | 7/2014 | Heineman et al. | |
| 9,026,501 B2* | 5/2015 | Fujihara | G11B 27/107 707/690 |
| 9,207,229 B2* | 12/2015 | Bates | G11B 23/042 |
| 9,275,070 B2* | 3/2016 | Fujihara | G11B 27/107 |
| 9,696,909 B2* | 7/2017 | Fujihara | G11B 27/107 |
| 9,824,720 B1 | 11/2017 | Breuer | G11B 23/046 |
| 2003/0016609 A1 | 1/2003 | Rushton | G11B 11/10595 369/53.2 |
| 2003/0067703 A1* | 4/2003 | Holmes | G11B 23/0305 360/69 |
| 2003/0067704 A1* | 4/2003 | Woo | G11B 23/0302 360/69 |
| 2004/0004145 A1* | 1/2004 | Stamm | G11B 23/042 242/348 |
| 2004/0004789 A1* | 1/2004 | Watanabe | G06K 19/041 360/132 |
| 2006/0062096 A1* | 3/2006 | Kerr | G06K 19/04 369/30.27 |
| 2006/0077585 A1* | 4/2006 | Larson | G11B 15/07 360/69 |
| 2007/0171561 A1* | 7/2007 | Yip | G11B 15/07 360/69 |
| 2009/0310253 A1* | 12/2009 | Georgis | G11B 23/0303 360/92.1 |
| 2010/0157766 A1 | 6/2010 | Gregg et al. | |
| 2010/0309582 A1* | 12/2010 | Sato | G11B 23/041 360/132 |
| 2011/0019304 A1* | 1/2011 | Heineman | G11B 15/6835 360/93 |
| 2013/0083638 A1 | 4/2013 | Edling et al. | |
| 2016/0047793 A1* | 2/2016 | Bates | G11B 23/042 506/9 |
| 2018/0314442 A1* | 11/2018 | Tokai | G06F 3/0619 |

FOREIGN PATENT DOCUMENTS

| | | | | |
|---|---|---|---|---|
| GB | 2406963 A | * | 4/2005 | ............ G11B 15/68 |
| JP | 08045131 A | * | 2/1996 | |
| JP | 11213618 A | * | 8/1999 | |
| JP | 2000132883 A | * | 5/2000 | |
| JP | 2002251861 A | * | 9/2002 | |
| JP | 2004220660 A | * | 8/2004 | |
| JP | 2005285179 A | * | 10/2005 | |
| JP | 2005293625 A | * | 10/2005 | |
| JP | 2005293626 A | * | 10/2005 | |
| JP | 2006114211 A | * | 4/2006 | ............ G11B 15/07 |
| WO | WO-0058966 A1 | * | 10/2000 | ....... G11B 23/08714 |

OTHER PUBLICATIONS

NXP, "MFRC522 Stabdard performance MIFARE and NTAG frontend," NXP, Product data sheet, Rev. 309, Apr. 27, 2016, pp. 1-95 retrieved from https://www.nxp.com/documents/data_sheet/MFRC522.pdf.

Analog Devices, "Small, Low Power, 3-Axis +3 g Accelerometer, ADXL335," Rev. 0, 2009, pp. 1-16 retrieved rom https://www.sparkfun.com/datasheets/Components/SMD/adxl335.pdf.

Texas Instruments, "RF430CL330H Dynamic NFC Interface Transponder," SLAS916C, Nov. 2012, Revised Nov. 2014, pp. 1-50 retrieved from http://www.ti.com/lit/ds/symlink/rf430cl330h.pdf.

Texas Instruments, "RF430FRL 15xH NFC ISO 15693 Sensor Transponder," SLAS834C, Nov. 2012, Revised Dec. 2014, pp. 1-53 retrived from http://www.ti.com/lit/ds/slas834c/slas834c.pdf.

Industrial Embedded Systems, "Piezoelectric motors save power and downsize electronic access control," Jul. 25, 2008, pp. 1-6 retrieved from http://industrial.embedded-computing.com/article-id/?3422=.

PTB, "Micro-Electro-Mechanical System," PTB, retrieved from https://www.ptb.de/cms/en/ptb/fachabteilungen/abt5/fb-51/ag-5110/antastverfahren0/mems0.html on May 18, 2018, pp. 1-7.

Espressif, "ESP8266 Low Power Solutions," Espressif, Version 1.1, 2016, 16 pages retrieved from http://www.espressif.com/sites/default/files/9b-esp8266-low_power_solutions_en_0.pdf.

Hippargi et al., U.S. Appl. No. 16/509,344, filed Jul. 11, 2019.

* cited by examiner

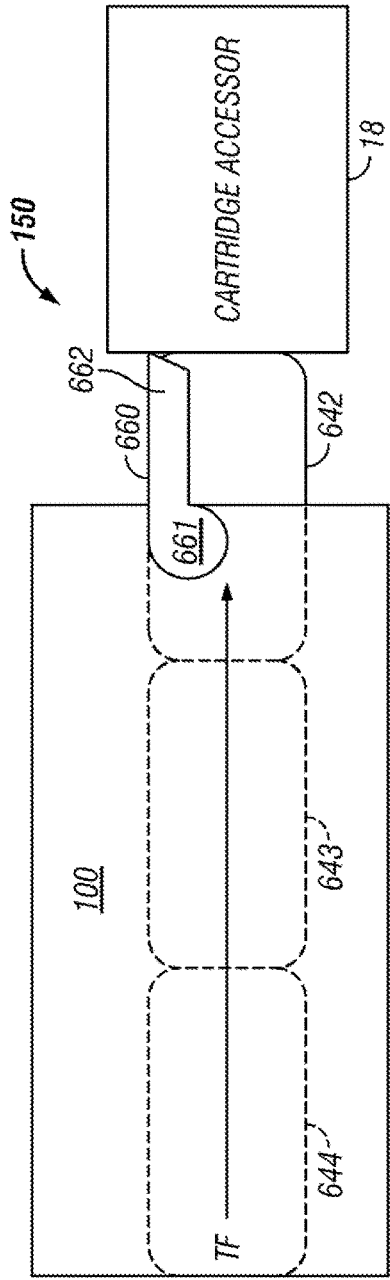
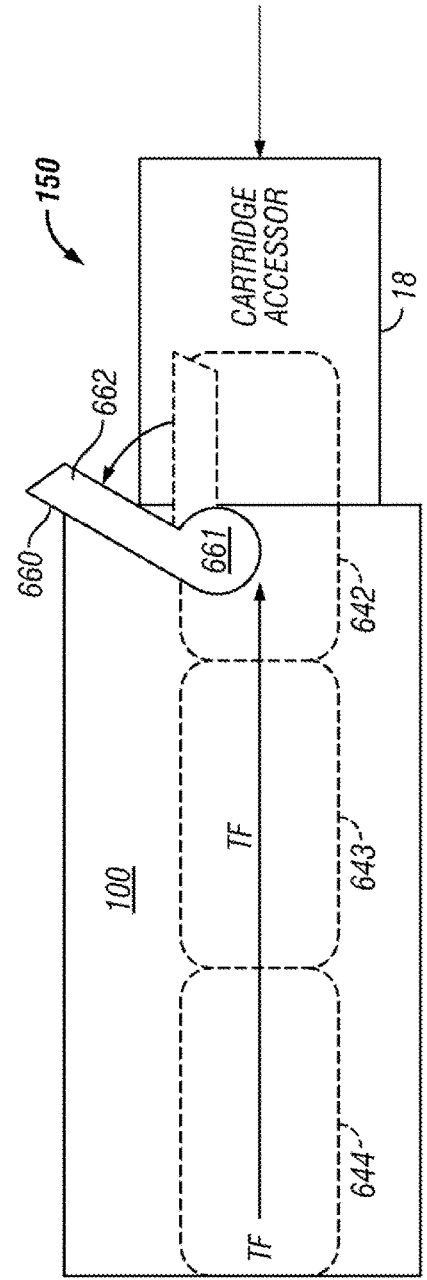
FIG. 8A
FIG. 8B

REMOTELY CONTROLLING A MAGNETIC TAPE CARTRIDGE

BACKGROUND

The present invention relates to data storage systems, and more particularly, this invention relates to a magnetic tape cartridge capable of being remotely controlled and/or communicated with without loading the magnetic tape cartridge into a tape drive.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

SUMMARY

A data storage cartridge according to one embodiment includes a housing configured to house a data storage medium, a sensor coupled to the housing, and a microcontroller coupled to the sensor. The microcontroller is configured to wirelessly communicate information about the sensor.

A data storage cartridge according to a further embodiment includes a housing configured to house a data storage medium, a cartridge memory coupled to the housing, the cartridge memory having a wireless communications interface, and a microcontroller in physical communication with the cartridge memory. The microcontroller is configured to wirelessly communicate information retrieved from the cartridge memory.

A data storage cartridge according to another embodiment includes a housing configured to house a data storage medium therein, a mechanical write protect mechanism coupled to the housing of the data storage cartridge, an actuator coupled to the mechanical write protect mechanism for selectively changing a state of the mechanical write protect mechanism, and a microcontroller in communication with the actuator. The microcontroller is configured to control the actuator.

Any of these embodiments may be implemented in conjunction with a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIGS. 8A-8D are partial side views of a cartridge blocking mechanism according to one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Various embodiments include data storage cartridges that are configured to wirelessly communicate information about the data storage cartridge, and/or control various components of the data storage cartridge. Illustrative data storage cartridges include magnetic tape cartridges, optical media cartridges, etc. To place the inventive concepts disclosed herein in a context, much of the description herein refers to a tape cartridge. This has been done by way of example only, and the concepts disclosed in the various exemplary embodiments may be readily applied to any type of data storage cartridge.

In one general embodiment, a data storage cartridge includes a housing configured to house a data storage medium, a sensor coupled to the housing, and a microcontroller coupled to the sensor, the microcontroller being configured to wirelessly communicate information about the sensor.

In another general embodiment, a data storage cartridge includes a housing configured to house a data storage medium therein, a cartridge memory coupled to the housing, the cartridge memory having a wireless communications interface, and a microcontroller in physical communication with the cartridge memory. The microcontroller is configured to wirelessly communicate information retrieved from the cartridge memory.

In another general embodiment, a data storage cartridge includes a housing configured to house a data storage medium therein, a mechanical write protect mechanism coupled to the housing of the data storage cartridge, an actuator coupled to the mechanical write protect mechanism for selectively changing a state of the mechanical write protect mechanism, and a microcontroller in communication with the actuator. The microcontroller is configured to control the actuator.

Figure 1:
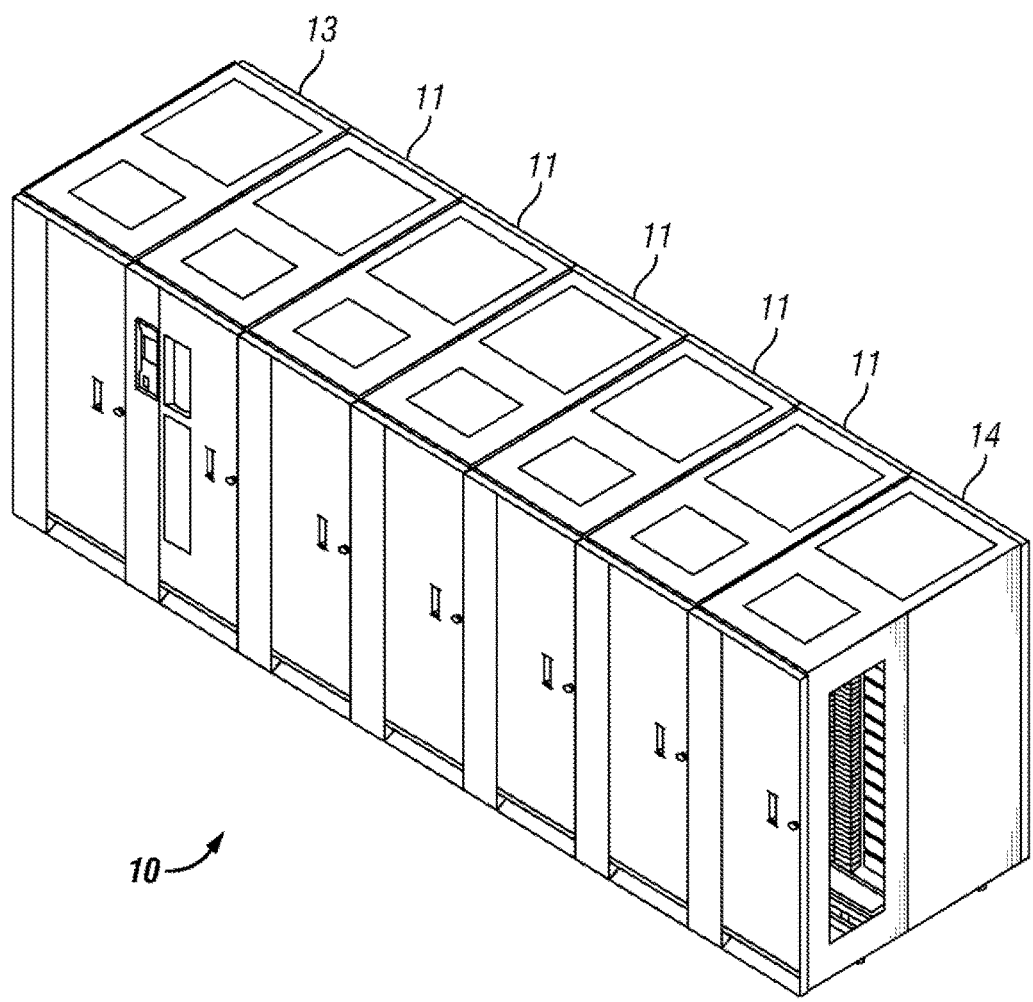
FIG. 1 is a perspective view of an automated data storage library according to one embodiment.
Figure 2:
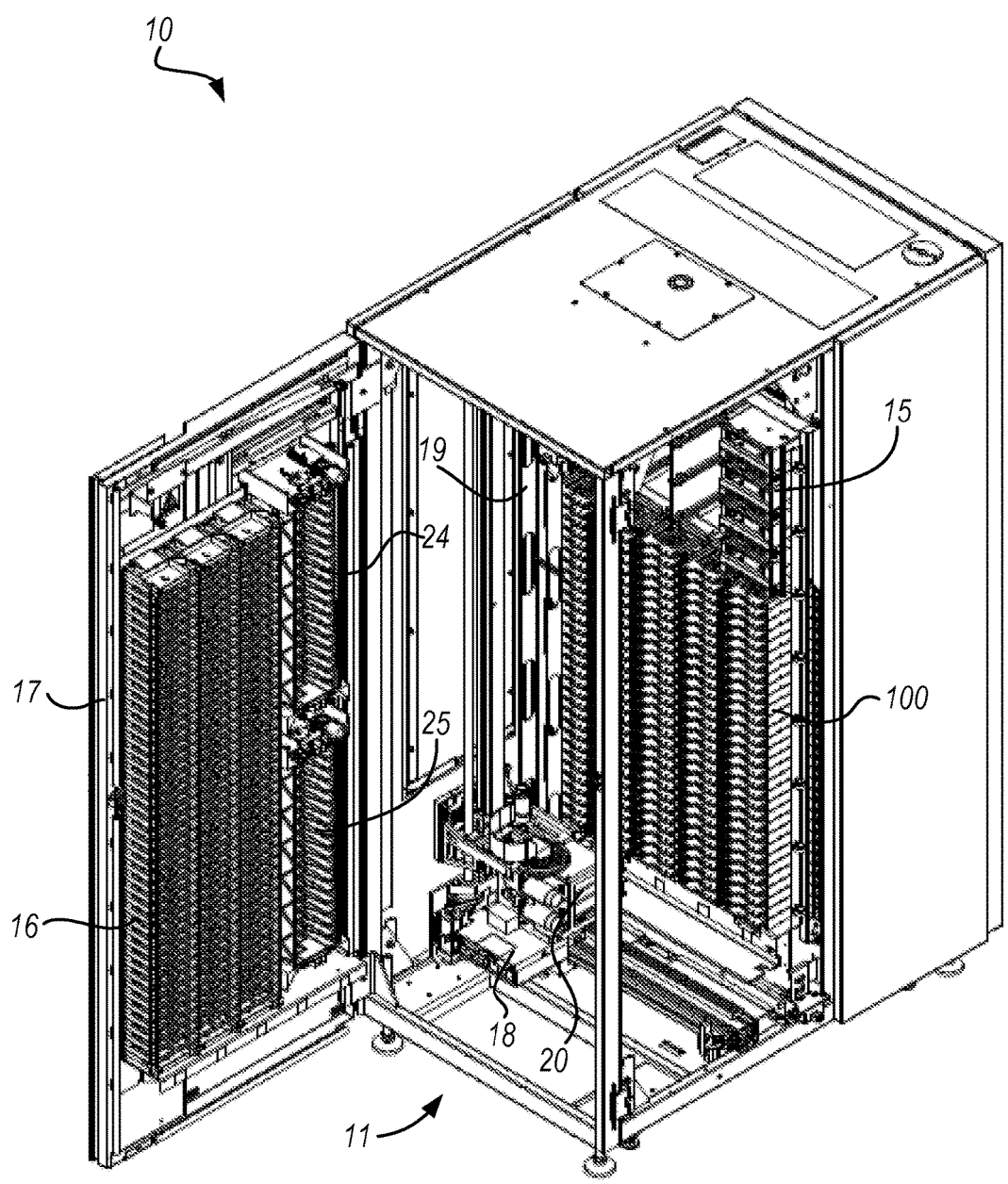
FIG. 2 is a perspective view of a storage frame from the data storage library of FIG. 1.

FIGS. 1-2 illustrate an automated data storage library 10 which stores and retrieves data storage cartridges, containing data storage media (not shown), from multi-cartridge deep slot cells 100 and single cartridge storage slots 16. An example of an automated data storage library which has a similar configuration as that depicted in FIGS. 1-2, and may be implemented with some of the various approaches herein is the IBM 3584 UltraScalable Tape Library. Moreover, it should be noted that references to "data storage media" herein refer to data storage cartridges, and for purposes of the present application, the two terms may be used synonymously.

The library 10 of FIG. 1 comprises a left hand service bay 13, one or more storage frames 11, and right hand service bay 14. As will be discussed in further detail below, a frame may comprise an expansion component of the library. Thus, storage frames may be added or removed to expand or reduce the size and/or functionality of the library. According to different approaches, frames may include additional storage slots, deep slot cells, drives, import/export stations, accessors, operator panels, etc.

FIG. 2 shows an exemplary embodiment of a storage frame 11, which acts as the base frame of the library 10. Moreover, the storage frame 11 illustrated in FIG. 2 is contemplated to be a minimum configuration of the library 10, for which there is only a single accessor 18 (i.e., there are no redundant accessors) and no service bay. However, in other embodiments, a storage frame may include multiple robotic accessors and/or service bays.

Looking to FIG. 2, the library 10 is arranged for accessing data storage media in response to commands from at least one external host system (not shown). The library 10 includes a plurality of storage slots 16 on front wall 17 and a plurality of multi-cartridge deep slot cells 100 on rear wall 19, both of which may be used for storing data storage cartridges that may contain data storage media. According to one approach, the storage slots 16 are configured to store a single data storage cartridge, and the multi-cartridge deep slot cells 100 are configured to store a plurality of data storage cartridges. In a preferred approach, the multi-cartridge deep slot cells may be arranged in sequential order of tiers from front to rear (e.g., see FIG. 7A).

With continued reference to FIG. 2, the storage frame 11 of the library 10 also includes at least one data storage drive 15, e.g., for reading and/or writing data with respect to the data storage media. Additionally, a first accessor 18 may be used to transport data storage media between the plurality of storage slots 16, the multi-cartridge deep slot cells, and/or the data storage drive(s) 15. According to various approaches, the data storage drives 15 may be optical disc drives, magnetic tape drives, solid state drives having non-volatile random access memory (NVRAM) such as Flash memory, or other types of data storage drives as are used to read and/or write data with respect to the data storage media.

As illustrated, the storage frame 11 may optionally include an operator panel or other user interface, such as a web-based interface, which allows a user to interact with the library 10. The storage frame 11 may also optionally comprise an upper I/O station 24 and/or a lower I/O station 25, thereby allowing data storage cartridges to be added (e.g., inserted) to the library inventory and/or removed from the library without disrupting library operation. Furthermore, the library 10 may have one or more storage frames 11, each having storage slots 16, preferably accessible by the first accessor 18.

As described above, the storage frames 11 may be configured with different components depending upon the intended function. One configuration of storage frame 11 may comprise storage slots 16 and/or multi-cartridge deep slot cells 100, data storage drive(s) 15, and other optional components to store and retrieve data from the data storage cartridges. However, in another approach, a storage frame 11 may include storage slots 16 and/or multi-cartridge deep slot cells 100 and no other components. The first accessor 18 may have a gripper assembly 20, e.g., for gripping one or more data storage media, in addition to having a bar code scanner or other reading system, such as a cartridge memory reader or similar system mounted on the gripper assembly 20, to "read" identifying information about the data storage media.

Figure 3:
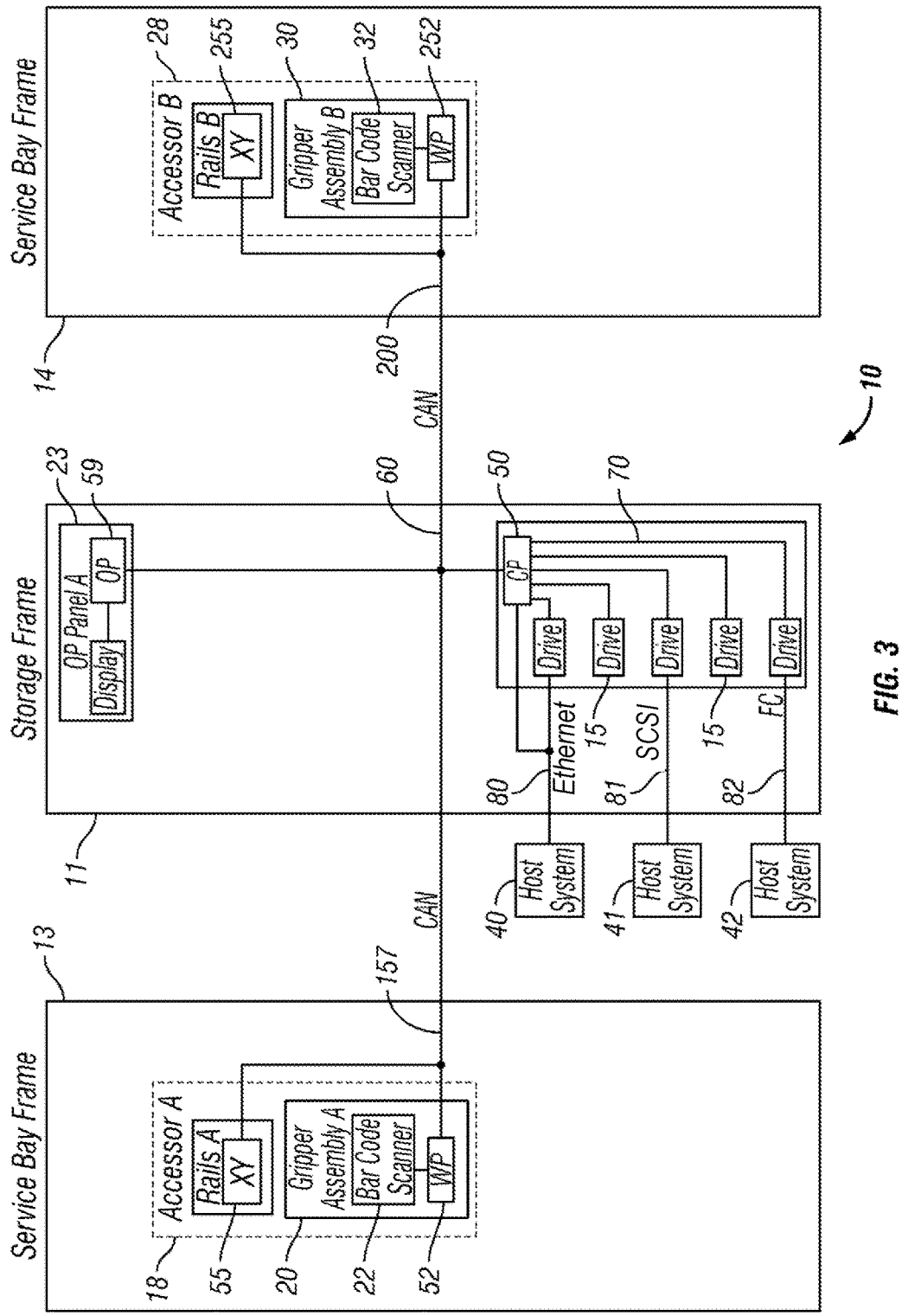
FIG. 3 is a block diagram of an automated data storage library according to one embodiment.

FIG. 3 depicts an automated data storage library 10, in accordance with one embodiment. As an option, the present automated data storage library 10 may be implemented in conjunction with features from any other embodiment listed herein, such as those described with reference to the other FIGS. Of course, however, such automated data storage library 10 and others presented herein may be used in various applications and/or in permutations which may or may not be specifically described in the illustrative embodiments listed herein. Further, the automated data storage library 10 presented herein may be used in any desired environment. Thus FIG. 3 (and the other FIGS.) should be deemed to include any and all possible permutations.

Referring now to FIG. 3, the automated data storage library 10 as described in reference to FIGS. 1 and 2, is depicted according to one embodiment. According to a preferred approach, the library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as responding to host requests for element status, inventory, library status, etc. The specific commands, the conversion of those commands to physical movements, and the operation of the drives may be of a type known to those of skill in the art.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed.

Referring still to FIG. 3, the library 10 may have one or more storage frames 11, a left hand service bay 13 and a right hand service bay 14. The left hand service bay 13 is shown with a first accessor 18, where, as discussed above, the first accessor 18 may include a gripper assembly 20 and/or a bar code scanner (e.g., reading system) to "read" identifying information about the data storage media depending on the desired embodiment. Furthermore, the right hand service bay 14 is shown having a second accessor 28, which includes a gripper assembly 30 and may also include a reading system 32 to "read" identifying information about the data storage media.

According to one approach, in the event of a failure or other unavailability of the first accessor 18, or its gripper assembly 20, etc., the second accessor 28 may perform some or all of the functions of the first accessor 18. Thus, in different approaches, the two accessors 18, 28 may share one or more mechanical paths, they may have completely independent mechanical paths, or combinations thereof. In one example, the accessors 18, 28 may have a common horizontal rail with independent vertical rails to travel therealong. Moreover, it should be noted that the first and second accessors 18, 28 are described as first and second for descriptive purposes only and this description is not meant to limit either accessor to an association with either the left hand service bay 13, or the right hand service bay 14.

In an exemplary embodiment which is in no way intended to limit the invention, the first and second accessors 18, 28 may preferably move their grippers in at least two directions, called the horizontal "X" direction and vertical "Y" direction, e.g., to retrieve and grip, deliver and release, load and unload, etc. the data storage cartridge at the storage slots 16, multi-cartridge deep slot cells 100, data storage drives 15, etc.

With continued reference to FIG. 3, library 10 receives commands from one or more host systems 40, 41, 42. The host systems 40, 41, 42, such as host servers, communicate with the library directly, e.g., on path 80, through one or more control ports (not shown), or through one or more data storage drives 15 on paths 81, 82. Thus, in different approaches, the host systems 40, 41, 42 may provide commands to access particular data storage cartridges and move the cartridges, for example, between the storage slots 16 and the data storage drives 15. The commands are typically logical commands identifying the cartridges or cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/or second accessor 18, 28. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to line 80.

Still referring to FIG. 3, the communication processor node 50 may additionally provide a communication link 70 for communicating with the data storage drives 15. As illustrated, the communication processor node 50 may preferably be located in the storage frame 11, e.g., close to the data storage drives 15. Furthermore, one or more additional work processor nodes may be provided to form an exemplary distributed processor system, which may comprise, e.g., a work processor node 52 located at first accessor 18, and that is coupled to the communication processor node 50 via a network 60, 157. According to different approaches, each work processor node may respond to received commands that are broadcast thereto from any communication processor node, and the work processor nodes may also direct the operation of the accessors, e.g., providing move commands. An XY processor node 55 may be provided and may be located at an XY system of first accessor 18. As illustrated, the XY processor node 55 is coupled to the network 60, 157, and is responsive to the move commands, operating the XY system to position the gripper assembly 20.

Also, an operator panel processor node 59 may be provided at the optional operator panel for providing an interface for communicating between the operator panel and the communication processor node 50, the work processor nodes 52, 252, and the XY processor nodes 55, 255.

A network 60, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

As illustrated in FIG. 3, the communication processor node 50 is coupled to each of the data storage drives 15 of a storage frame 11, via lines 70, and are thereby communicating with the drives 15 and with host systems 40, 41, 42. Alternatively, the host systems 40, 41, 42 may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are intended to be Ethernet and a SCSI bus, respectively, e.g., and may serve as host connections. However, bus 82 comprises an example of a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as Ethernet, or a serial connection, such as RS-422. Thus the data storage drives 15 may be individually coupled to the communication processor node 50 by lines 70. Alternatively, the data storage drives 15 may be coupled to the communication processor node 50 through one or more networks.

Furthermore, additional storage frames 11 may be provided, whereby each is preferably coupled to the adjacent storage frame. According to various approaches, any of the additional storage frames 11 may include communication processor nodes 50, storage slots 16, data storage drives 15, networks 60, etc.

Moreover, as described above, the automated data storage library 10 may comprise a plurality of accessors. A second accessor 28, for example, is shown in a right hand service bay 14 of FIG. 3. The second accessor 28 may include a gripper assembly 30 for accessing the data storage media, and an XY system 255 for moving the second accessor 28. The second accessor 28 may run on the same horizontal mechanical path as the first accessor 18, and/or on an adjacent (e.g., separate) path. Moreover the illustrative control system additionally includes an extension network 200 which forms a network coupled to network 60 of the storage frame(s) 11 and to network 157 of left hand service bay 13.

In FIG. 3 and the accompanying description, the first and second accessors are associated with the left hand service bay 13 and the right hand service bay 14 respectively. However, this is for illustrative purposes and there may not be an actual association. Thus, according to another approach, network 157 may not be associated with the left hand service bay 13 and network 200 may not be associated with the right hand service bay 14. Moreover, depending on the design of the library, it may not be necessary to have a left hand service bay 13 and/or a right hand service bay 14 at all.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 4:
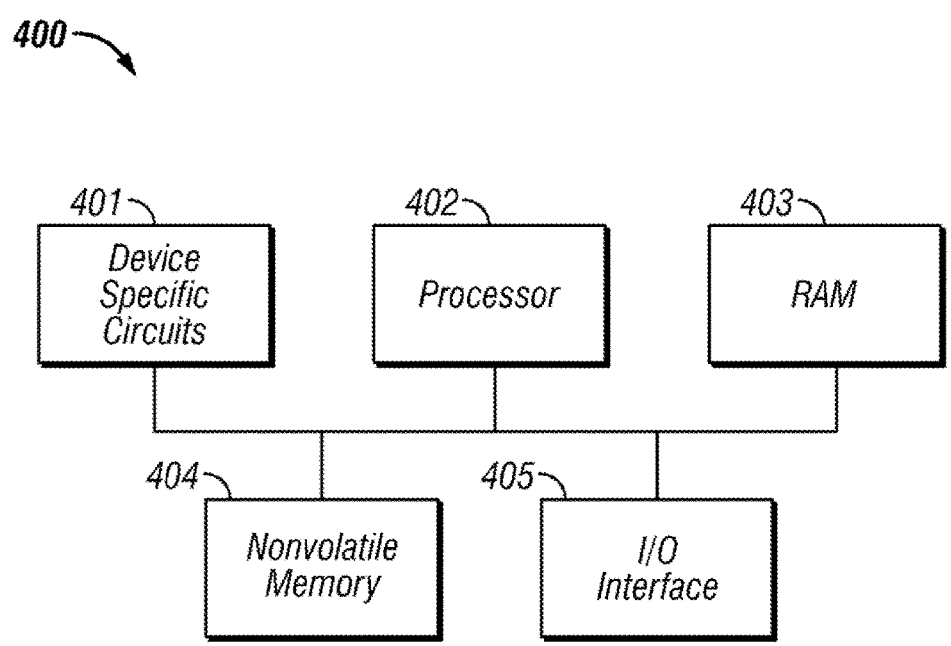
FIG. 4 is a block diagram depicting a controller configuration according to one embodiment.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data. Moreover, the I/O interface 405 comprises a communication interface that allows the processor 402 to communicate with devices external to the controller. Examples may comprise, but are not limited to, network interfaces such as an ethernet interface; serial interfaces such as RS-232, USB (Universal Serial Bus) or Small Computer Systems Interface (SCSI); etc. The device specific circuits 401 provide additional hardware to enable the controller 400 to perform unique functions including, but not limited to, motor control of a cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 5A:
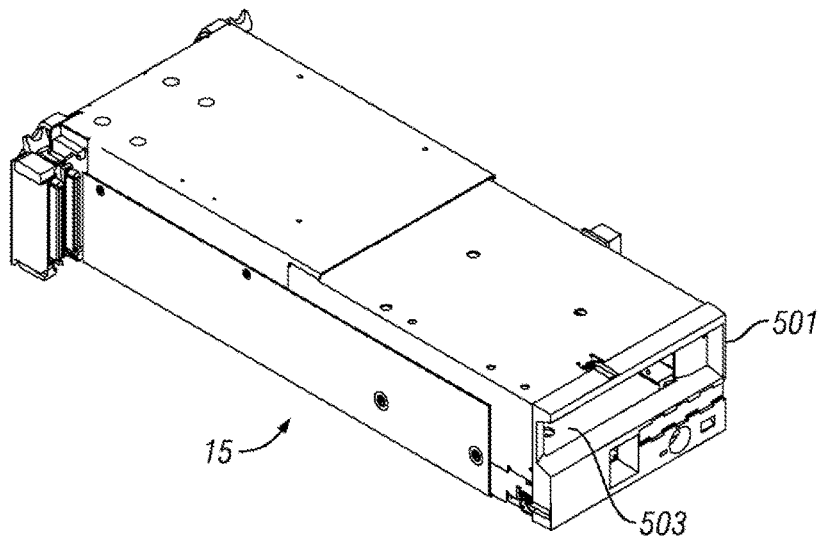
FIG. 5A is a front perspective view of a data storage drive according to one embodiment.
Figure 5B:
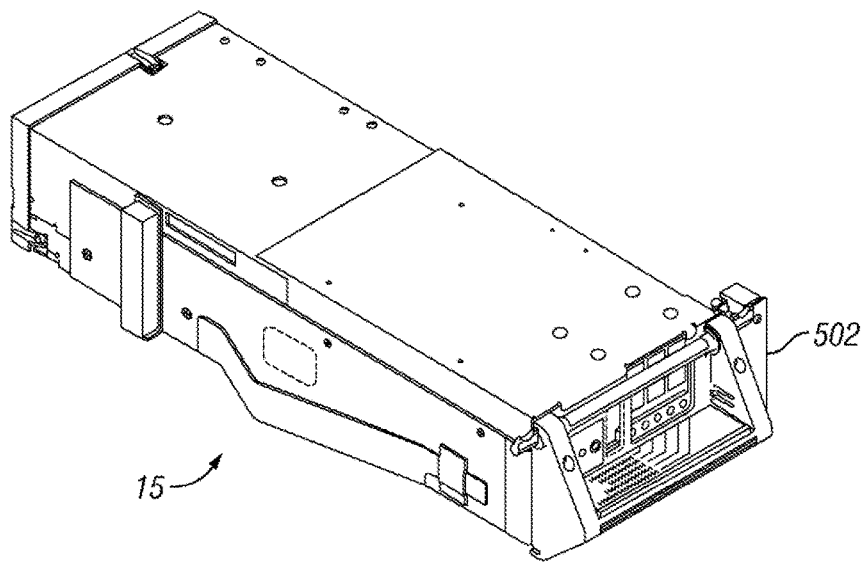
FIG. 5B is a rear perspective view of the data storage drive of FIG. 5A.

FIGS. 5A-5B illustrate the front 501 and rear 502 views of a data storage drive 15, according to one embodiment. In the example depicted in FIGS. 5A-5B, the data storage drive 15 comprises a hot-swap drive canister, which is in no way intended to limit the invention. In fact, any configuration of data storage drive may be used whether or not it includes a hot-swap canister. As discussed above, a data storage drive 15 is used to read and/or write data with respect to the data storage media, and may additionally communicate with a memory which is separate from the media, and is located within the cartridge. Thus, according to one approach, a data storage cartridge may be placed into the data storage drive 15 at opening 503.

Figure 6:
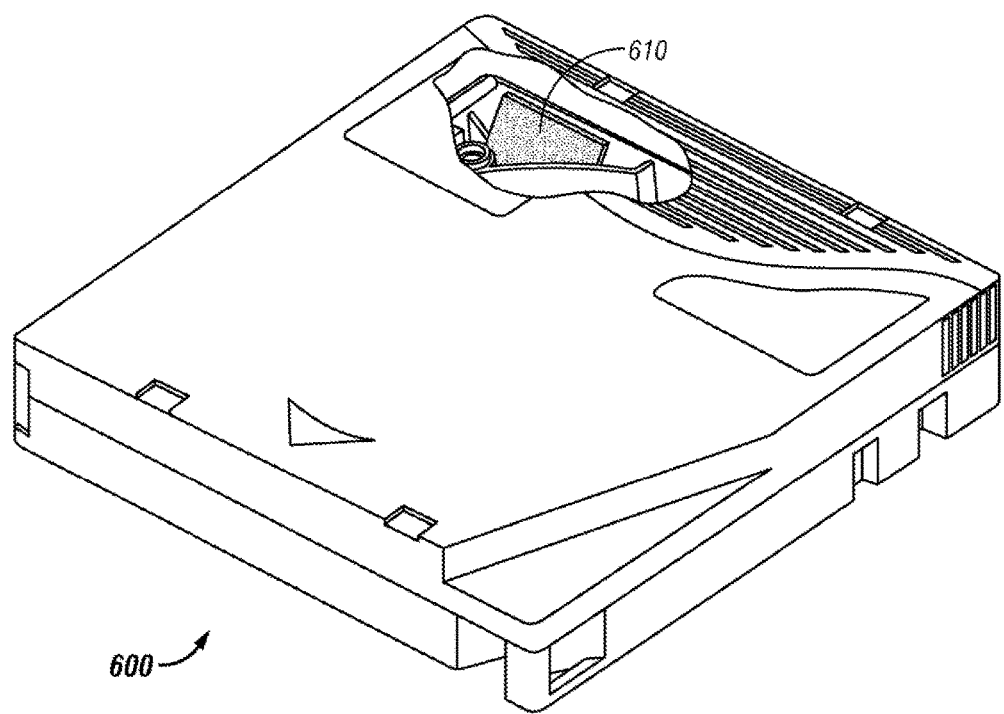
FIG. 6 is perspective view of a data storage cartridge having a cutaway portion, according to one embodiment.

Furthermore, FIG. 6 illustrates an embodiment of a data storage cartridge 600 with a cartridge memory 610 shown in a cutaway portion of the Figure, which is in no way intended to limit the invention. In fact, any configuration of data storage cartridge may be used whether or not it comprises a cartridge memory. According to various approaches, media of the data storage cartridge media may include any type of media on which data may be stored, including but not limited to magnetic media, e.g., magnetic tape, disks, etc.; optical media, e.g., optical tape, discs, etc.; electronic media, e.g., PROM, EEPROM, flash PROM, CompactFlash™, Smartmedia™, Memory Stick™, etc.; etc., or other suitable media. Moreover, an example of a data storage cartridge that is widely employed in automated data storage libraries for mass data storage is a magnetic tape cartridge in which the media is magnetic tape.

Figure 7A:
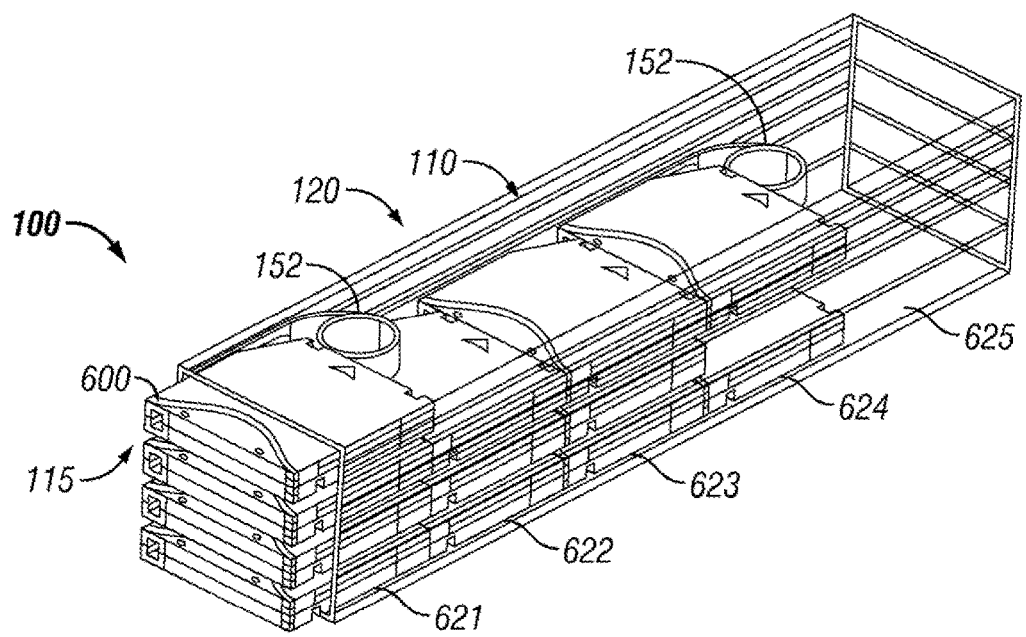
FIGS. 7A-7B are perspective views of a multi-cartridge deep slot cell according to one embodiment.
Figure 7B:
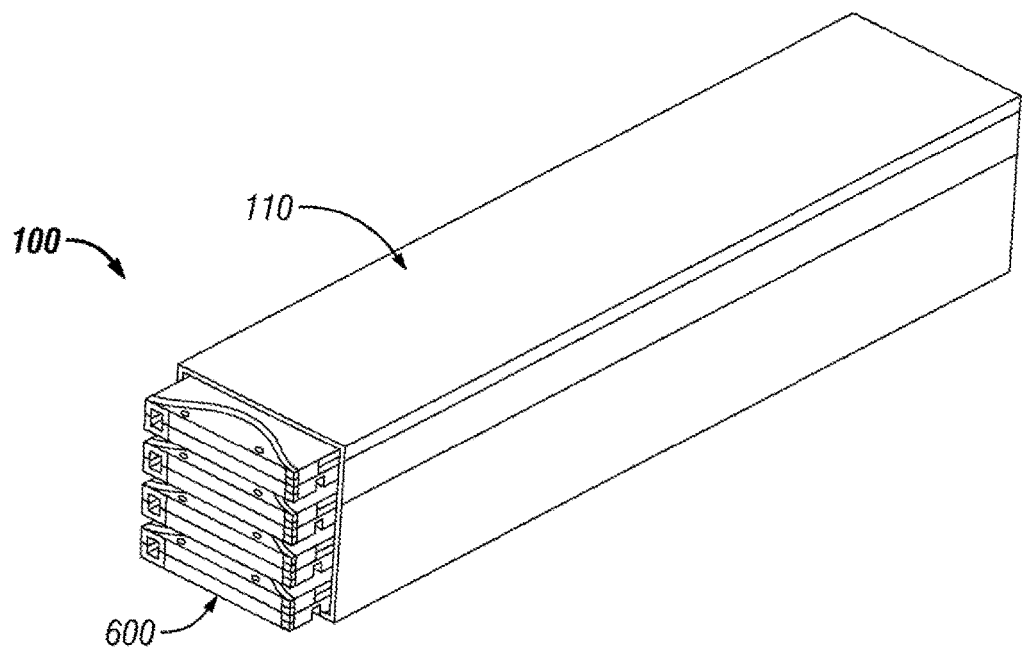

Looking now to FIGS. 7A-7B, a multi-cartridge deep slot cell 100 having biasing springs 152 is depicted according to one embodiment. As shown in the illustrative embodiment, the multi-cartridge deep slot cell 100 comprises a housing 110 defining an interior space 115. Furthermore, a plurality of storage slots 120 is disposed within the housing, and may be configured for storing up to a plurality of data storage cartridges 600, depending on the desired approach. Alternatively, the multi-cartridge deep slot cell 100 may be built into the frame of the automated data storage library according to one approach.

FIGS. 8A-8D illustrate an embodiment of a cartridge blocking mechanism 150 having a retaining gate 660 that retains the data storage cartridges in the multi-cartridge deep slot cell 100 according to one embodiment. As illustrated, according to one approach, the retaining gate 660 may be externally attached to a multi-cartridge deep slot cell 100, relative to a front opening of the multi-cartridge deep slot cell 100, whereby the retaining gate 660 can be activated by an accessor 18, e.g., of an automated tape library. Moreover, the retaining gate 660 allows for positive cartridge retention against the pressure of biasing springs (see 152 of FIGS. 7A-7B), and ensures that one or more data storage cartridges do not get pushed out of the multi-cartridge deep slot cell 100 simultaneously, while allowing the pushing mechanism (not shown) of the multi-cartridge deep slot cell 100 to continuously push data storage cartridge(s) to the opening in a multi-cartridge deep slot cell 100. Thus, according to one approach, the accessor 18 may open the retaining gate to gain access to the data storage cartridge in tier 1 and, upon its extraction, the biasing spring 152 moves the cartridge(s) positioned behind the extracted cartridge forward, thereby promoting the cartridge(s) by one tier as will soon become apparent.

Figure 8C:
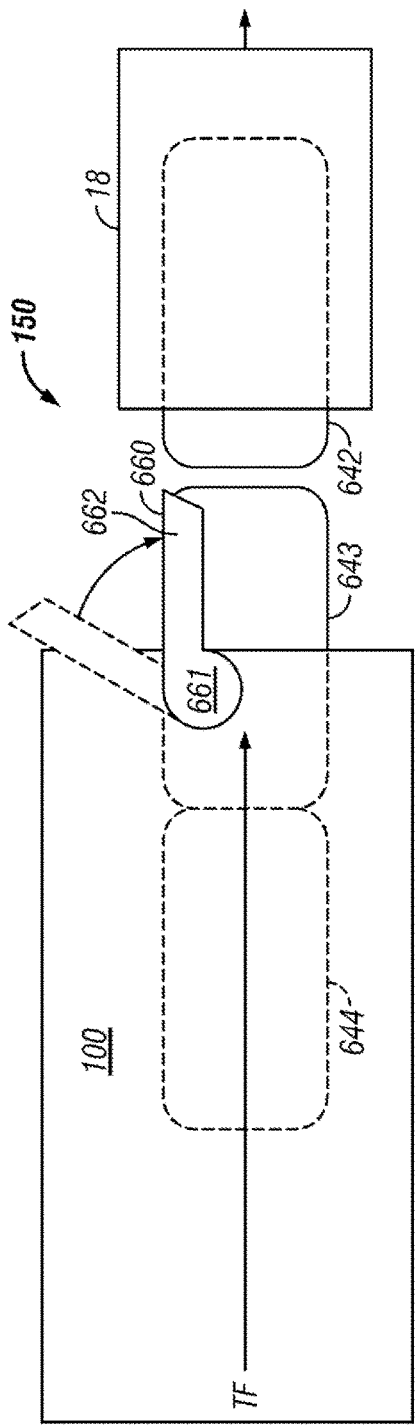

The basic working of the retaining gate is that the gate prevents the data storage cartridge(s) from being pushed out of a multi-cartridge deep slot cell 100. For example, as shown in FIGS. 8A-8D, a retaining gate 660 can be lifted by, for example, accessor 18 or by a front storage cartridge 642 for cartridge removal from/insertion into a multi-cartridge deep slot cell 100. Specifically, retaining gate 660 has a pivoting arm 661 mounted on multi-cartridge deep slot cell 100 via a pivoting post (not shown) that can be integral to a construction of multi-cartridge deep slot cell 100. Pivoting arm 661 is located below a catch 662 of retaining gate 660 whereby a thrust force TF through data storage cartridge 644-642 caused by the pushing mechanism (not shown) of multi-cartridge deep slot cell 100 causes retaining gate 660 to stay closed in a retaining position as shown in FIG. 8A. Moreover, the retaining gate 660 is preferably biased such that it closes in the downward direction over the front opening of multi-cartridge deep slot cell 100. This constant biasing may be achieved via gravity as shown in FIG. 8A or by implementing a spring force, e.g., attached to retaining gate 660 (not shown).

For removal of front storage cartridge 642 by accessor 18 from multi-cartridge deep slot cell 100, retaining gate 660 must be lifted upward to a releasing position whereby catch 662 of retaining gate 660 is disengaged from front storage cartridge 642. This can be seen in FIG. 8B where accessor 18 interfaces with retaining gate 660 by providing a lifting force. Once retaining gate 660 is lifted to the releasing position and accessor 18 is engaged with storage cartridge 642, accessor 18 can pull storage cartridge 642 out of multi-cartridge deep slot cell 100 and into accessor 18 without any interference of retaining gate 660 as shown in FIG. 8C. In view of storage cartridges 644 and 643 being stored in multi-cartridge deep slot cell 100, retaining gate 660 must return to its retaining position to prevent storage cartridges 644 and 643 from being ejected from multi-cartridge deep slot cell 100 by the thrust force TF of the pushing mechanism (not shown). During extraction of front storage cartridge 642 through the front opening of multi-cartridge deep slot cell 100, the retaining gate 660, which is being biased downward, moves back to the retaining position to engage storage cartridge 643.

Figure 8D:
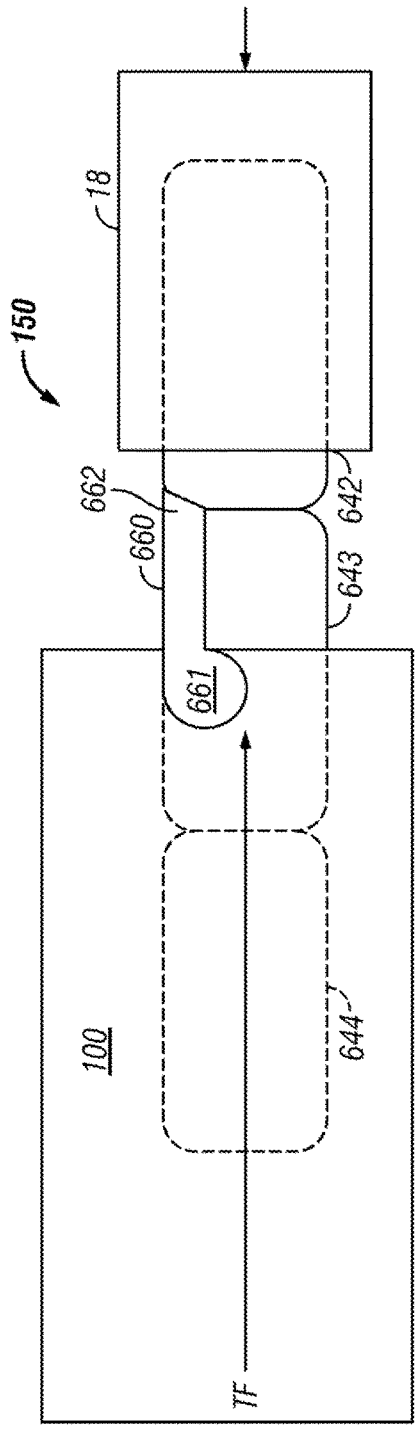

Once front storage cartridge 642 is extracted and storage cartridges 643 and 644 are retained from being pushed out of multi-cartridge deep slot cell 100, retaining gate 660 has successfully completed its cartridge retrieval process. Now retaining gate 660 demonstrates its ability to work for cartridge insertion into multi-cartridge deep slot cell 100. When accessor 18 begins to insert storage cartridge 642 back into multi-cartridge deep slot cell 100, retaining gate 660 is lifted to its releasing position to allow storage cartridge 642 through the front opening of multi-cartridge deep slot cell 100. Catch 662 of retaining gate 660 interfaces with a rear portion of storage cartridge 642, in particular a beveled surface of catch 662 as shown in FIG. 8D, whereby retaining gate 660 is lifted to its releasing position as shown in FIG. 8B due to storage cartridge 642 being pushed in multi-cartridge deep slot cell 100 by accessor 18. In doing so, storage cartridges 644, 643 are pushed deeper into multi-cartridge deep slot cell 100 by storage cartridge 642 in multi-cartridge deep slot cell 100 by accessor 18. Thus, the accessor is able to provide a force greater than the thrust force TF antiparallel thereto, to overcome the directional biasing of the storage cartridges 644, 643. Upon full insertion into multi-cartridge deep slot cell 100, retaining gate 660 moves to its retaining position to engage storage cartridge 642 as shown in FIG. 8A.

Thus, looking to various embodiments presented herein, access to a storage slot may include the ability to remove a cartridge from a storage slot, the ability to place a cartridge into a storage slot, or combinations thereof.

According to an exemplary embodiment, the storage slots from top to bottom are considered to be in parallel and comprise the same tier. Moreover, the storage slots from front to back, in a particular row, are considered to be in series and comprise sequential tiers.

Referring back to FIGS. 7A-7B, in accordance with one embodiment, storage slots 120 are depicted as being configured for storing up to a plurality of data storage cartridges 600, and arranged in sequential order of tiers 621, 622, 623, 624, 625 from front to rear. It should be noted that the frontmost tier 621 is also called "tier 1", while the next tier 622 is called "tier 2", etc., and the last tier 625 is also called the "rearmost" tier. However, referring to FIG. 2, in one embodiment, the single cartridge storage slots 16 are also termed "tier 0".

Referring again to FIGS. 1-3, according to one embodiment, the controller of automated data storage library 10 may operate the accessor(s) 18, 28 to selectively extract, place and/or transport data storage cartridges with respect to the multi-cartridge deep slot cells 100 and/or other elements of the automated data storage library 10. For example, the controller may facilitate extracting a cartridge from a multi-cartridge deep slot cell 100, transporting the cartridge to a data storage drive 15 and placing the cartridge in the drive 15. The controller may then extract the cartridge from the data storage drive 15, while directing the accessor to transport the cartridge to a specific multi-cartridge deep slot cell 100, and place the cartridge therein.

In one embodiment, one or more data storage cartridges may be added into the library, e.g., at an I/O station 24, 25, whereby the controller of the automated data storage library 10 may then operate the accessor(s) 18, 28 to transport the cartridge(s) to specific multi-cartridge deep slot cell(s) 100, and place the cartridge(s) therein. Similarly, the controller may operate the accessor(s) to selectively extract, place and transport data storage cartridges with respect to the single cartridge storage slots 16, and/or transport inserted or added cartridge(s) to specific single cartridge storage slots 16.

Figure 9:
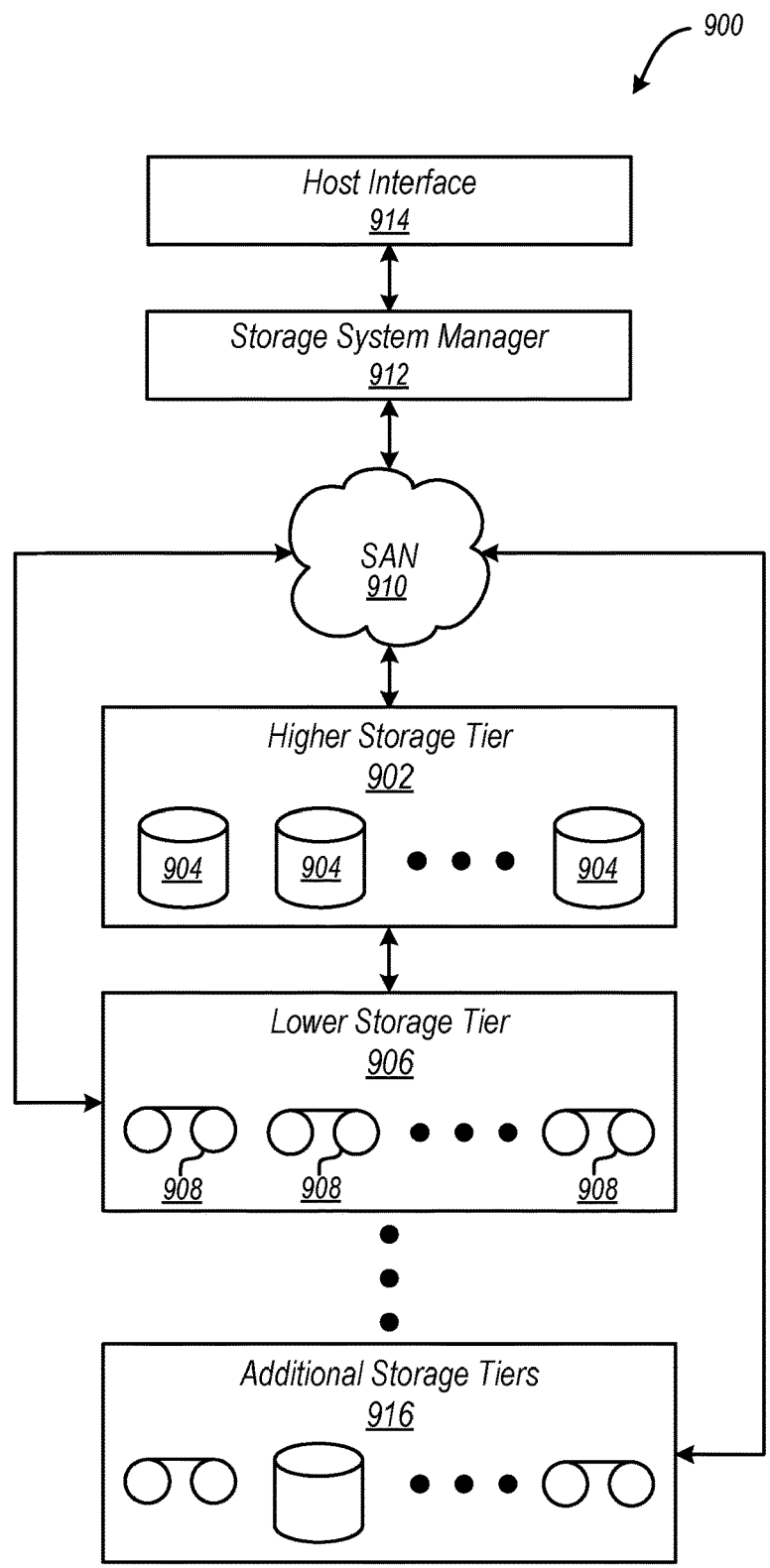
FIG. 9 illustrates a tiered data storage system in accordance with one embodiment.

Now referring to FIG. 9, a storage system 900 is shown according to one embodiment. Note that some of the elements shown in FIG. 9 may be implemented as hardware and/or software, according to various embodiments. In some approaches, the storage system 900 may be implemented in an automated data storage library such as that shown in FIGS. 1-2. In other approaches, an automated data storage library such as that shown in FIGS. 1-2 may be a tier of the storage system 900.

The storage system 900 may include a storage system manager 912 for communicating with a plurality of media on at least one higher storage tier 902 and at least one lower storage tier 906. The higher storage tier(s) 902 preferably may include one or more random access and/or direct access media 904, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 906 may preferably include one or more lower performing storage media 908, including sequential access media such as magnetic tape in tape drives and/or optical media, slower accessing HDDs, slower accessing SSDs, etc., and/or others noted herein or known in the art. One or more additional storage tiers 916 may include any combination of storage memory media as desired by a designer of the system 900. Also, any of the higher storage tiers 902 and/or the lower storage tiers 906 may include some combination of storage devices and/or storage media.

The storage system manager 912 may communicate with the storage media 904, 908 on the higher storage tier(s) 902 and lower storage tier(s) 906 through a network 910, such as a storage area network (SAN), as shown in FIG. 9, or some other suitable network type. The storage system manager 912 may also communicate with one or more host systems (not shown) through a host interface 914, which may or may not be a part of the storage system manager 912. The storage system manager 912 and/or any other component of the storage system 900 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 900 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 902, may include a majority of SSD storage media for storing data in a higher performing storage environment, and remaining storage tiers, including lower storage tier 906 and additional storage tiers 916 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 902, while data not having one of these attributes may be stored to the additional storage tiers 916, including lower storage tier 906. Of course, one of skill in the art, upon reading the present descriptions, may devise many other combinations of storage media types to implement into different storage schemes, according to the embodiments presented herein.

According to some embodiments, the storage system (such as 900) may include logic configured to receive a request to open a data set, logic configured to determine if the requested data set is stored to a lower storage tier 906 of a tiered data storage system 900 in multiple associated portions, logic configured to move each associated portion of the requested data set to a higher storage tier 902 of the tiered data storage system 900, and logic configured to assemble the requested data set on the higher storage tier 902 of the tiered data storage system 900 from the associated portions. Of course, this logic may be implemented as a method on any device and/or system or as a computer program product, according to various embodiments.

As mentioned above, to place the inventive concepts disclosed herein in a context, much of the description herein refers to a tape cartridge. Again, this has been done by way of example only, and the concepts disclosed in the various exemplary embodiments may be readily applied to any type of data storage cartridge.

Figure 10:
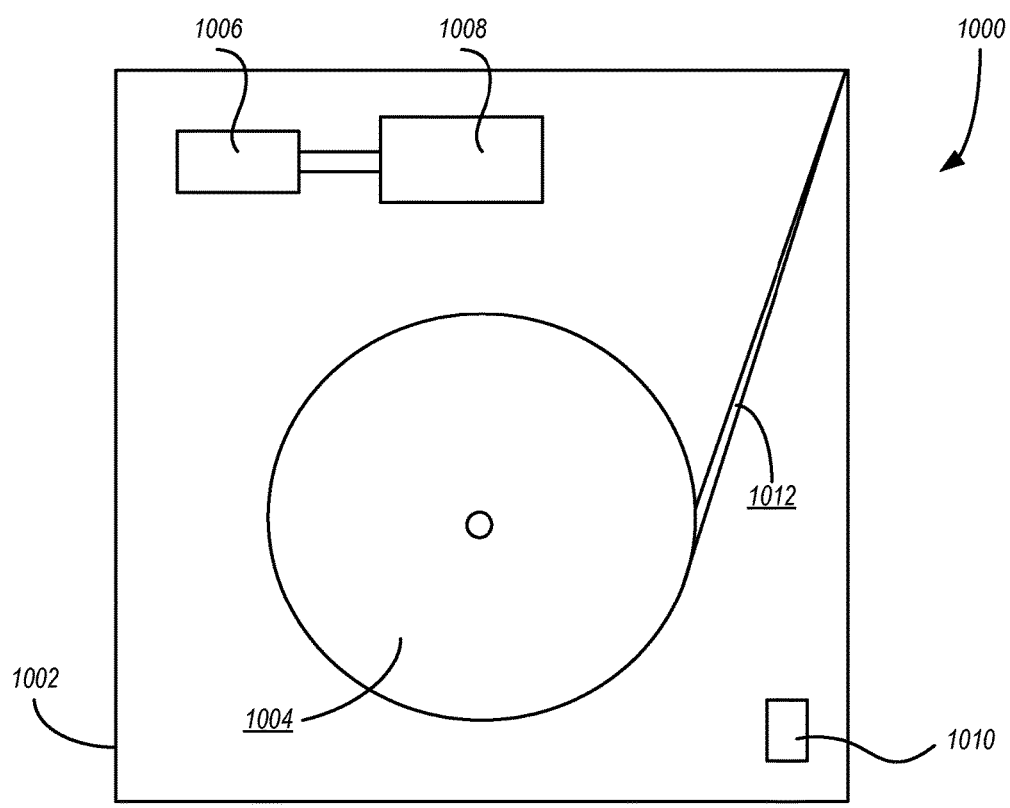
FIG. 10 is a schematic diagram of a tape cartridge according to one embodiment.

FIG. 10 depicts an exemplary tape cartridge 1000 in accordance with one embodiment. As an option, the present exemplary tape cartridge 1000 may be implemented in conjunction with features from any other embodiment listed herein, such as those described with reference to the other FIGS. Of course, however, such an exemplary tape cartridge 1000 and others presented herein may be used in various applications and/or in permutations which may or may not be specifically described in the illustrative embodiments listed herein. Further, the exemplary tape cartridge 1000 presented herein may be used in any desired environment.

As shown, the tape cartridge 1000 includes a housing 1002, a data storage medium 1004 in the housing 1002, a sensor 1006 coupled to the housing 1002, and a microcontroller 1008 coupled to the sensor 1006. While one specific implementation of a tape cartridge is shown in FIG. 10, it should be noted that the embodiments described herein may be implemented in the context of any type of media cartridge.

In some approaches, the sensor 1006 may be embedded inside the housing 1002, as shown in FIG. 10. In more approaches, the sensor 1006 may be attached to the inside or outside of the housing 1002 without modification of the housing 1002. For example, the sensor 1006 may be embedded in a self-adhesive label 1010.

As shown, the housing 1002 is configured to house a magnetic recording tape 1004 therein. A leading end 1012 of the magnetic recording tape 1004 is also shown. However, in equivalent embodiments, the housing may house other types of data storage media such as an optical medium, or any other data storage medium known in the art that is read by an external drive.

The microcontroller 1008 coupled to the sensor 1006 is configured to wirelessly communicate information about the sensor. This information can be derived from the output of the sensor, values calculated based on sensor output, or any other form of information communicated by the sensor. The sensor 1006 may communicate information to the microcontroller 1008 via a communication bus, an analog I/O channel, a digital I/O channel or any other mechanism known in the art or any various combination of methods. The microcontroller 1008 may then wirelessly communicate that information to a computer, a library controller, etc. The microcontroller 1008 may use any known wireless communication technique. Examples include near field communications, WiFi, Bluetooth, etc. The microcontroller 1008 may be considered to include any wireless communications circuit coupled thereto.

The microcontroller 1008 may wirelessly communicate information about the sensor 1006 in response to any desired stimulus or event. For example, the microcontroller 1008 may wirelessly communicate information about the sensor 1006 upon receiving a request from a remote device, during a communication with a remote computer, etc. In another approach, the microcontroller 1008 may wirelessly communicate information about the sensor 1006 without first receiving a request, such as upon detecting an event such as a drop, periodically, immediately upon becoming powered e.g., via RF power harvesting, etc.

The sensor 1006 coupled to the housing 1002 may include a leader pin switch 1100 (FIG. 11), a sensor configured to detect a status of a mechanical write protect mechanism 1402 (FIG. 14), a temperature sensor, a humidity sensor, a snapped tape sensor 1200 (FIG. 12), a cartridge drop sensor, a pack-shift sensor, or any other sensor that may become apparent while reading this disclosure to one having ordinary skill in the art. The sensor 1006 may include one or more of the listed sensors. The sensor 1006 may be an array of multiple sensors.

With continued reference to FIG. 10, the sensor 1006 may be a sensor configured to detect a status of a mechanical write protect mechanism such as the write protect mechanism 1402 of FIG. 14, which is discussed in detail below. The mechanical write protect mechanism selectively permits and prevents writing to the data storage medium.

In one approach, the mechanical write protect mechanism may include a magnetic tape write protect flag for activating or deactivating a sensor-switch located in a magnetic tape drive. For example, the magnetic tape drive may sense a digital signal of 0 if the flag is in the locked position. When the flag is in the locked position, the magnetic tape drive may only read data from the magnetic tape cartridge. Alternatively, the magnetic tape drive may sense a digital signal of 1 if the flag is in the unlocked position. When the flag is in the unlocked position, the magnetic tape drive may write data to and read data from the magnetic tape cartridge.

Detection of the status of the mechanical write protect mechanism is useful to improve the efficiency of the system and prevent unnecessary delays. For example, in large datacenters, prior to the present inventive concepts, an operator had to extract the magnetic tape drive cartridge from a magnetic tape library to determine the flag position by visual inspection, or load the cartridge in a drive to determine the flag position without removing the cartridge from the magnetic tape library.

In another embodiment, the sensor 1006 coupled to the housing 1002 may be configured to detect an environmental condition associated with a data storage cartridge. In one approach, the environmental condition may exist in the vicinity of a data storage cartridge, e.g., within and/or outside of the cartridge. In another approach, the environmental condition may be a condition of a portion of a data storage cartridge. An environment condition may be any environmental condition known in the art. Exemplary environmental conditions include temperature and humidity. Additional environmental conditions may include electromagnetic feedback, air quality, atmospheric pressure, etc.

In another embodiment, the sensor 1006 coupled to the housing 1002 may include a sensor configured to detect an event associated with the tape cartridge. An exemplary event detection may include detecting a drop. Accordingly, the sensor 1006 may include a cartridge drop sensor such as an acceleration sensor and/or an impact sensor.

Current cartridges cannot detect a drop of the magnetic tape cartridge and the resulting potential interference with proper operation. A dropped magnetic tape cartridge may result in leader pin misplacement and/or pack shift in the wound up tape material. The pack shift may cause damage to the edges of the leading end 1012 of the magnetic recording tape. The magnetic tape drive may also be unable to follow the servo signal due to the tape rapidly shifting laterally when a shifted portion of the wound tape is reached during reading or writing. The acceleration sensor may send an alert message, e.g., via a WLAN connection, directly to a host computer, a magnetic tape library controller, etc.

The acceleration sensor may include any acceleration sensor know in the art. Exemplary acceleration sensors may include piezoelectric accelerometers, micro electro-mechanical systems (MEMS), thermal convective accelerometers, etc. In one embodiment, the acceleration sensor is a 3 axis accelerometer such as an ADXL335.

A cartridge drop sensor may comprise an impact sensor. The impact sensor may detect a drop of the cartridge. The impact sensor may include a piezoelectric sensor, a piezoelectric resistor, a strain gage sensor, or any other impact sensor known in the art.

In another approach, the sensor may comprise a sensor to detect vibrations. External vibrations with high amplitudes may cause a tape drive to overwrite other data tracks and/or servo tracks during a write operation. Upon detecting indication of a vibration from the sensor, the microcontroller may send an alert to a library controller and/or remote computer, store an indication of the time and characteristic (e.g., amplitude) of the vibration in cartridge memory, etc. Conventional tape cartridges do not include vibration sensors.

In some approaches, the microcontroller 1008 may send an alert message via a WLAN connection directly to the host computer or the magnetic tape library controller. The alert message may include a drop cartridge alert derived from output of a drop cartridge sensor. The alert message may include information with a timestamp indicating when the drop occurred.

In another embodiment, the sensor 1006 coupled to the housing 1002 may include a pack-shift sensor. A data storage cartridge 1000 may comprise a spool, the spool having a hub around which the data storage medium 1004 is wound and a flange coupled to the hub. The wound up magnetic tape material wound around the hub may become shifted due to a drop of the cartridge, through normal use, or as a result of damage to the edges of the wound up material. The pack-shift sensor 1006 may be configured to detect a shift in packing position of the data storage medium 1004 relative to the flange. A pack shift sensor may use an optical detection technique known in the art.

As shown, the microcontroller 1008 may be used for detecting the mechanical status of a tape cartridge and accessing cartridge memory information without the need to load the magnetic tape cartridge into a magnetic tape drive. The microcontroller 1008 is configured for wireless communication between the tape cartridge microcontroller 1008 and the magnetic tape library controller or other computer host, e.g., which may allow use of a web-browser based interface for interacting with the tape cartridge microcontroller. The microcontroller 1008 may be any low power consuming microcontroller known in the art. An exemplary embodiment may include an ESP8266 microcontroller.

The microcontroller 1008 enables retrieval of the status of a data storage cartridge without any additional device besides a wirelessly connected computer located anywhere. For example, some approaches enable retrieval of information from the cartridge before the robot retrieves the cartridge from a storage slot and/or the tape cartridge is mounted in a tape drive. This aspect is useful, for example, for efficiently determining the status of a dropped or otherwise potentially damaged cartridge. Otherwise, the cartridge would have to be retrieved, mounted and/or physically inspected to determine the status of the cartridge.

The microcontroller 1008 may wirelessly communicate information about the sensor to the remote computer, where such information may be output to a user. The user may receive information about the cartridge efficiently without having to manually load and unload the cartridge into a tape drive. The microcontroller 1008 efficiently passes on detailed information about the status of the cartridge without manipulation of the cartridge. The library controller or user or the application may easily discern whether or not to load or unload a cartridge based on whether or not the cartridge is likely damaged.

The microcontroller 1008 may be powered using any known power source.

In one approach, the microcontroller 1008 may be powered by a power harvesting circuit that creates current from incident RF energy, said current being sufficient to enable proper operation of the microcontroller 1008.

In another approach, the microcontroller 1008 may be coupled to a power management and battery charging circuit. The battery or batteries coupled to the microcontroller 1008 may be charged via a physical connection within a storage slot or tape drive. Another approach may use a power harvesting circuit that creates current from incident RF energy, and said current is directed to the battery charging circuit.

In yet another approach, a nonrechargeable battery may be used to power the microcontroller 1008.

To reduce power consumption, the microcontroller 1008 may be put in a deep sleep mode. This deep sleep mode may additionally be characterized as a low power consumption mode. To take the microcontroller 1008 out of this mode, a tilt switch may be implemented. In another approach, the microcontroller 1008 may utilize a low power activation circuit that can be awakened with a digital signal, e.g. logical 0 or 1, a predefined activation code, etc. In other approaches, the microcontroller 1008 may set an interrupt triggered to wake the processor when an IP address is accessed.

The microcontroller 1008 may be configured to wirelessly communicate information about the sensor 1006. In some approaches, the microcontroller 1008 may wirelessly communicate information derived from an output of the sensor 1006. For example, such information may be values output from the sensor and/or values calculated based on sensor output.

In some approaches, the microcontroller 1008 utilizes software to keep track of the position of a leader pin switch, e.g., as discussed in more detail below with reference to FIG. 11. For example, when the software detects the status of the leader pin sensor to be 0, the leader pin may be correctly positioned. Alternatively, when the software detects the status of the leader pin sensor as 1, then the leader pin may be misplaced or missing. In one approach, the leader pin sensor status may be subsequently transferred from an internal HTTP page and memory via a WLAN connection to the library controller. The leader pin sensor status may alternatively be sent to a computer. The magnetic tape library controller can request status information via HTTP GET commands or MQTT standard messaging. After the leader pin sensor status is successfully delivered or pulled in response to the request, the microcontroller 1008 may be put back into a deep sleep mode for power saving.

Figure 11:
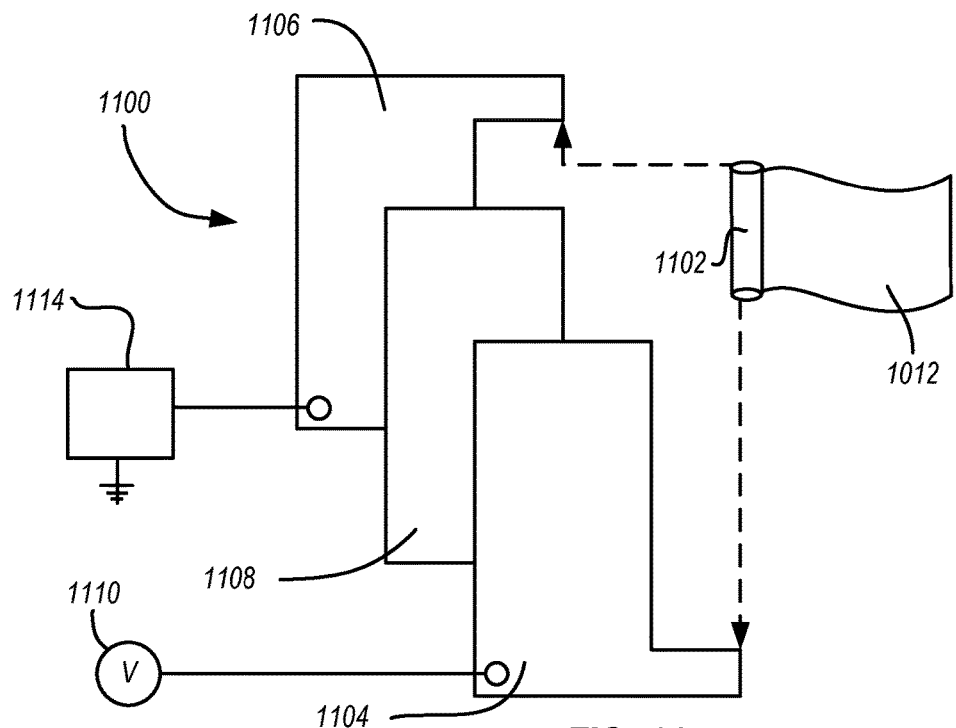
FIG. 11 is a schematic diagram of a leader pin switch according to one embodiment.

FIG. 11 illustrates a leader pin switch 1100 according to one embodiment. As an option, the present leader pin switch 1100 may be implemented in conjunction with features from any other embodiment listed herein, such as those described with reference to the other FIGS. Of course, however, such a leader pin switch 1100 and others presented herein may be used in various applications and/or in permutations which may or may not be specifically described in the illustrative embodiments listed herein. Further, the leader pin switch 1100 presented herein may be used in any desired environment.

The leader pin switch 1100 may be used in a tape cartridge 1000 (FIG. 10) having a leader pin 1102. The leader pin 1102 is coupled to the leading end 1012 (FIG. 10) of the magnetic recording tape.

The leader pin switch 1100 is configured to detect when the leader pin is missing or misplaced. If the leader pin is missing, the tape cannot be threaded through a tape drive. If the leader pin is misplaced, the improper alignment can interfere with proper operation of the tape threading mechanism of a magnetic tape drive. For example, the tape threading mechanism may not properly grasp the pin, resulting in the pin becoming blocked in the tape drive. This blockage typically renders the drive inoperable. The leader pin 1102 may become misplaced because of a defect load-mechanism in a drive that previously used the magnetic tape cartridge. The leader pin 1102 may also become misplaced because of a defect leader pin clip of the magnetic tape cartridge or because the magnetic tape cartridge was dropped. Prior magnetic tape cartridges cannot detect whether the leader pin is misplaced or missing because no such sensor is available.

In the embodiment shown, the leader pin switch 1100 includes a top switch contact 1104 for contacting the leader pin 1102 when the leader pin is properly seated, a bottom switch contact 1106 for contacting the leader pin 1102 when the leader pin is properly seated, and an insulator layer 1108 between the top switch contact 1104 and the bottom switch contact 1106. The various components of the leader pin switch 1100 may be of any suitable material. In a preferred approach, the switch contacts are constructed of metal and the insulating layer 1108 is a plastic material.

When the leader pin 1102 is properly seated, a closed circuit between the top switch contact 1104 and the bottom switch contact 1106 is created. Accordingly, a potential may be applied to the top switch contact 1104, e.g., via a voltage source 1110. If current is detected at a detector 1114 (sensor) coupled to the bottom switch contact 1106, then a signal may be sent to the microcontroller indicative of proper seating of the leader pin.

In another embodiment, the microcontroller may be coupled directly to the leader pin switch 1100, whereby the leader pin switch 1100 acts as a sensor. In an exemplary configuration, an electrical wire is coupled to the top switch contact 1104 and an electrical ground potential is applied to the bottom switch contact 1106. An electrical "High Signal" may be applied to the wire connected to the top switch contact 1104 of the leader pin switch 1100 via a pull-up resistor (not shown). The bottom switch contact 1106 may be connected to an input IO-pin of the microcontroller 1008, which detects the presence or absence of the high signal.

Another embodiment of the leader pin switch 1100 may be constructed of a metal and a special form spring type mechanism. For example, the switch contacts 1104, 1106 may be configured to hold the leader pin 1102 in a nominal position when the tape is completely rewound into the cartridge, e.g., by exerting a slight biasing force on the leader pin 1102, in a similar manner to a conventional leader pin clip.

In yet another embodiment, the leader pin switch 1100 may be magnetically coupled to the leader pin 1102 when the leader pin is in the correct upright position. The magnetic coupling allows for easy release of the leader pin via the threading mechanism in a magnetic tape drive.

The leader pin switch 1100 may enable discernment of the status of the leader pin, such as correctly positioned, upright, incorrectly positioned, properly seated, tilted, or missing.

While one specific implementation of a leader pin switch is shown in FIG. 11, it should be noted that the embodiments described herein may be implemented in the context of any type of media cartridge design.

Yet another embodiment of a tape cartridge includes a sensor configured to detect potential damage to the magnetic recording tape. Damage to the magnetic recording tape may include the absence of the tape, damage to the edge of the tape, or any other possible inconsistencies in the magnetic recording tape. Illustrative sensors that may be used to detect potential damage to the magnetic recording tape may include an optical sensor that optically detects defects such as absence of the tape, edge curling, etc.; a tension sensor e.g., for detecting tape breakage; a contact sensor that detects inconsistencies along the edge of the tape, tape tension or lack thereof, etc.; etc.

Figure 12:
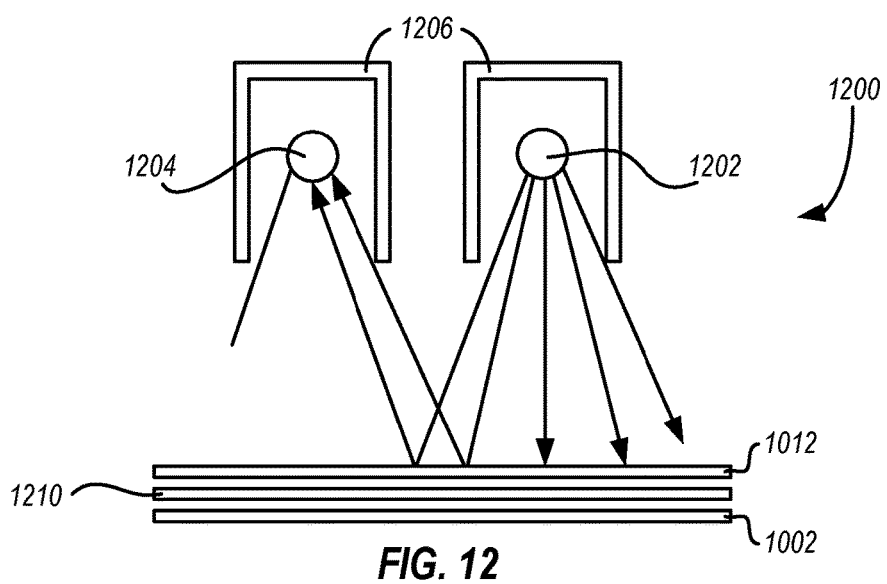
FIG. 12 is a schematic diagram of a snapped tape sensor according to one embodiment.

FIG. 12 illustrates a snapped tape sensor 1200 according to one embodiment. As an option, the present snapped tape sensor 1200 may be implemented in conjunction with features from any other embodiment listed herein, such as those described with reference to the other FIGS. Of course, however, such a snapped tape sensor 1200 and others presented herein may be used in various applications and/or in permutations which may or may not be specifically described in the illustrative embodiments listed herein. Further, the snapped tape sensor 1200 presented herein may be used in any desired environment.

Tape material may snap when the tape material gets too hot or where there is some edge damage to the tape itself and the tape tears as a result. The tape could also appear snapped where the tape was manually loaded into the library and a leader pin was dislocated. The snapped tape sensor 1200 in the embodiment shown detects when there is no tape between an anti-reflective coating 1210 and the snapped tape sensor 1200. In response to failure to detect presence of a tape, the cartridge may be unloaded and taken to an IO station where the cartridge can be recovered. A sensor for detecting snapped tape is not available in conventional tape cartridges.

In one approach, in the case that the tape snaps during operation, the magnetic tape drive may report a servo read error. The leading end 1012 of the magnetic recording tape may comprise a shiny and reflective material. A snapped tape sensor 1200 may use an optical detection sensor to detect whether the magnetic tape is snapped, cut, or otherwise missing. The optical sensor may comprise a red current beam or laser.

The illustrative snapped tape sensor 1200 depicted in FIG. 12 may be present in a tape cartridge, e.g., tape cartridge 1000 (FIG. 10). As shown, the snapped tape sensor 1200 includes an IR transmitter 1202 and an IR receiver 1204, each in separate enclosures 1206. The IR transmitter 1202 and IR receiver 1204 face the leading end 1012 (FIG. 10) of the magnetic recording tape positioned in front of an anti-reflective coating 1210 along the wall of the housing 1002 (FIG. 10).

In an exemplary approach, a micro infrared reflex light sensor may be implemented in a tape cartridge using a SMR IR-LED as the sender and a SMD IR-Transistor with a focus lens as the light receiver. An anti-reflective coating 1210 is added to the area of the housing 1002 of a magnetic tape cartridge behind the leading end 1012 of the magnetic recording tape. The IR beam is reflected by the tape and detected by the IR receiver 1204, but the IR beam will be absorbed by the anti-reflective coating 1210 when the magnetic tape is snapped, cut, or otherwise missing, resulting in a different signal output of the IR receiver 1204. This signal change may be detected by the IO of the microcontroller 1008. The microcontroller 1008 may then store the information into the cartridge memory 1302 for later use, report the detected damage to the library controller and/or remote computer, etc.

The snapped tape sensor 1200 may also function as a pack-shift sensor for detecting poorly wound up and/or shifted magnetic tape material by adjusting the IR-beam to the edge of the tape. The light may be reflected from the magnetic tape while the tape is wound or operated. The reflected signal level may defer for different winding scenarios. Different winding scenarios may include popped strands, pack slip, or flange pack of the wound up magnetic tape material.

Figure 13:
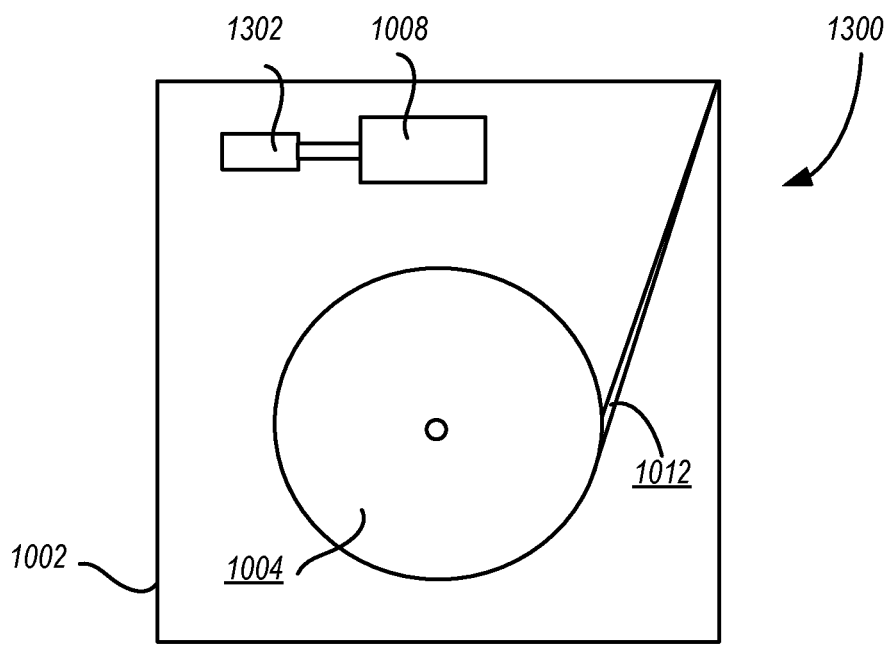
FIG. 13 is a schematic diagram of a tape cartridge according to one embodiment.

FIG. 13 illustrates an exemplary tape cartridge 1300 according to one embodiment. As an option, the present tape cartridge 1300 may be implemented in conjunction with features from any other embodiment listed herein, such as those described with reference to the other FIGS. Of course, however, such a tape cartridge 1300 and others presented herein may be used in various applications and/or in permutations which may or may not be specifically described in the illustrative embodiments listed herein. Further, the tape cartridge 1300 presented herein may be used in any desired environment.

As shown, the tape cartridge 1300 includes a housing 1002, a data storage medium 1004 in the housing 1002, a cartridge memory 1302 coupled to the housing 1002, and a microcontroller 1008 in physical communication with the cartridge memory 1302 and configured to wirelessly communicate information retrieved from the cartridge memory 1302. While one specific implementation of a tape cartridge is shown in FIG. 13, it should be noted that the embodiments described herein may be implemented in the context of any type of media cartridge.

In some approaches, the cartridge memory 1302 may be embedded inside the housing 1002. In more approaches, the cartridge memory 1302 may be attached to the inside or outside of the housing 1002 without modification of the housing 1002. For example, the cartridge memory may be embedded in a self-adhesive label. The cartridge memory 1302 may be a nonvolatile memory device, read-only memory (ROM) device, etc., embedded into or coupled to the inside or outside of the tape cartridge 1300.

A cartridge memory 1302 demonstrated in FIG. 13 may be any cartridge memory chip known in the art. Preferably, the cartridge memory 1302 has a wireless communications interface that allows wireless communication independently of the microcontroller 1008. An exemplary embodiment of the cartridge memory 1302 is an RFID chip with onboard memory. The cartridge memory 1302 may be used to identify, provide, and store any information as would become apparent to one having ordinary skill in the art upon reading this disclosure. A cartridge memory 1302 may be used by the magnetic tape drive to identify the magnetic tape cartridge loaded into the magnetic tape drive. In one approach, the cartridge memory 1302 may provide positioning information, filing status, and mount history of the last several different tape drive serial numbers. The magnetic tape drive may need this information in order to operate with the particular cartridge.

In conventional tape cartridges, a cartridge memory can only be accessed if the magnetic tape cartridge is loaded into a magnetic tape drive or with external RFID reader devices. Magnetic tape cartridges cannot currently communicate from an RFID cartridge memory to a host without a magnetic tape drive. Wireless communication via RFID is only available in limited distances, e.g. centimeter distances. Current magnetic tape cartridges cannot be accessed via an IP network. The configuration shown in FIG. 13 overcomes these limitations.

In an exemplary approach, the cartridge memory 1302 coupled to the housing 1002 may be an RFID cartridge memory chip with an I2C Bus System. This allows physical communication between the RFID chip and the microcontroller 1008. In addition to reading and writing data between the magnetic tape cartridge, the cartridge memory 1302, and the magnetic tape drive, additional reading and writing of data may be done between the cartridge memory 1302 and the microcontroller 1008. In this approach, the reading of data from and writing of data to the cartridge memory 1302 inside the magnetic tape cartridge may be done without mounting the magnetic tape cartridge into the magnetic tape drive.

The microcontroller 1008 may be in communication with the cartridge memory 1302 via a hard wired connection. This hard wired connection may include a I2C Bus System. This hard wired connection between the microcontroller 1008 and the cartridge memory 1302 enables exchange of information including programming and the status of the cartridge. The microcontroller 1008 may be configured to wirelessly communicate information retrieved from the cartridge memory 1302. This information may include values received directly from the cartridge memory or information derived from data stored in the cartridge memory, as would be understood by one skilled in the art upon reading the present description. This information from the cartridge memory 1302 may further be output to a web browser of a computer.

Figure 14:
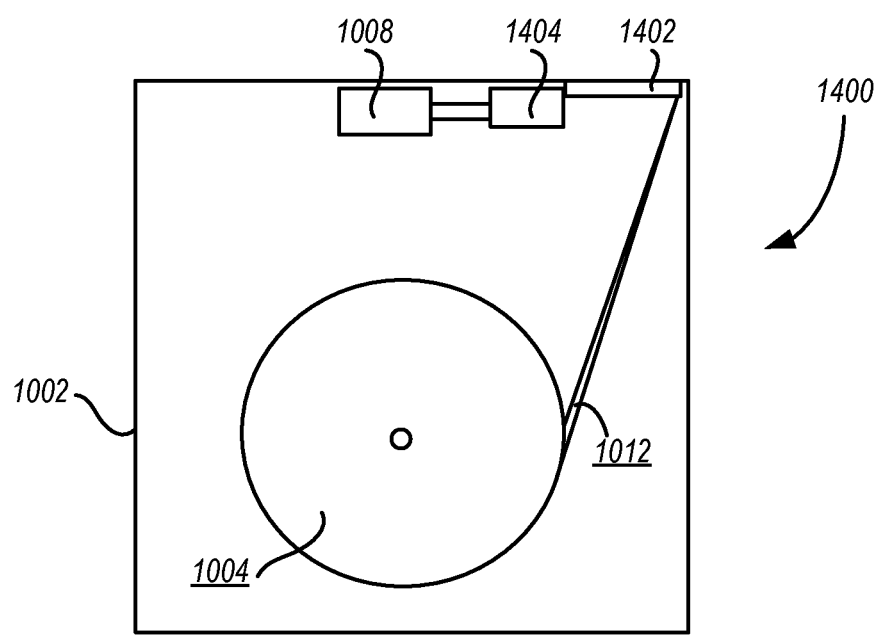
FIG. 14 is a schematic diagram of a tape cartridge according to one embodiment.

FIG. 14 depicts an exemplary tape cartridge 1400 having a remotely controllable write protection mechanism 1402, in accordance with one embodiment. As an option, the present exemplary tape cartridge 1400 may be implemented in conjunction with features from any other embodiment listed herein, such as those described with reference to the other FIGS. Of course, however, such an exemplary tape cartridge 1400 and others presented herein may be used in various applications and/or in permutations which may or may not be specifically described in the illustrative embodiments listed herein. Further, the exemplary tape cartridge 1400 presented herein may be used in any desired environment.

As shown, the tape cartridge 1400 includes a housing 1002, a data storage medium 1004 in the housing 1002, a mechanical write protect mechanism 1402 coupled to the housing 1002, an actuator 1404 coupled to the mechanical write protection mechanism 1402, and a microcontroller 1008 in communication with the actuator 1404, the microcontroller 1008 being configured to control the actuator 1404. While one specific implementation of a tape cartridge is shown in FIG. 14, it should be noted that the embodiments described herein may be implemented in the context of any type of media cartridge.

The actuator 1404 coupled to the mechanical write protection mechanism 1402 may be for selectively changing a state of the mechanical write protection mechanism 1402. In one approach, the actuator 1404 may be a small dimension and high force bi-stable actuator. The actuator 1404 may drive the mechanical write protection mechanism 1402.

Mechanical write protect mechanisms cannot be changed from a remote position in conventional cartridges. The mechanical write protect mechanism 1402 protects against accidentally overwriting data on the cartridge when the mechanism is in the locked position. Typically, the flag can be moved from a locked to an unlocked position and vice versa via a manual setting of said flag. In large datacenters, an operator must export conventional magnetic tape drive cartridges from a magnetic tape library to change the flag position by hand. No electrical positioning of the write protect flag is available in conventional cartridges.

The actuator 1404 coupled to the mechanical write protect mechanism 1402 of the current embodiment is able to change the position of the flag from a remote location, without loading the tape cartridge 1000, into a tape drive via wireless communication capabilities associated with the microcontroller 1008. This automates the process of locking and unlocking the flag position. The eliminates the time and hassle of manually changing the position of the flag and thus makes the process more efficient.

The microcontroller 1008 may be in communication with the actuator 1404 through any mechanism known in the art. In an exemplary approach, the microcontroller 1008 may be in communication with the actuator 1404 via a hardwired connection. The microcontroller 1008 may be configured to control the actuator.

Figure 15:
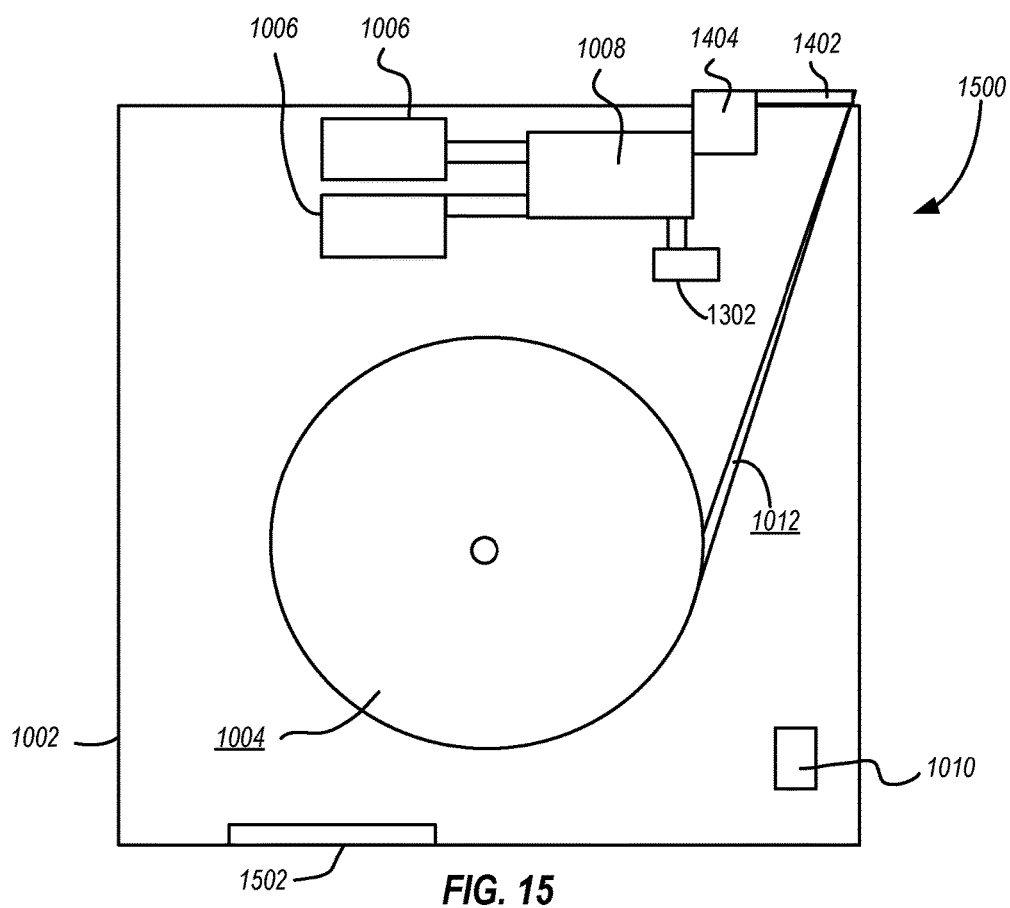
FIG. 15 is a schematic diagram of a tape cartridge according to one embodiment.

FIG. 15 depicts an exemplary tape cartridge 1500 in accordance with one embodiment. As an option, the present exemplary tape cartridge 1500 may be implemented in conjunction with features from any other embodiment listed herein, such as those described with reference to the other FIGS. Of course, however, such an exemplary tape cartridge 1500 and others presented herein may be used in various applications and/or in permutations which may or may not be specifically described in the illustrative embodiments listed herein. Further, the exemplary tape cartridge 1500 presented herein may be used in any desired environment.

As shown, the tape cartridge 1500 includes a housing 1002, a data storage medium 1004 in the housing 1002, a plurality of sensors 1006 coupled to the housing, and a microcontroller 1008 coupled to the sensors 1006. A cartridge memory 1302 is also coupled to the housing 1002, and the microcontroller 1008 is in communication with the cartridge memory 1302. A mechanical write protect mechanism 1402 is coupled to the housing 1002, an actuator 1404 is coupled to the mechanical write protection mechanism 1402, and the microcontroller 1008 is in communication with the actuator 1404, the microcontroller 1008 being configured to control the actuator 1404. While one specific implementation of a tape cartridge is shown in FIG. 15, it should be noted that the embodiments described herein may be implemented in the context of any type of media cartridge.

The data storage cartridge may also comprise a display device 1502 in communication with the microcontroller 1008. The display device may be any display device known in the art. Some embodiment may include an OLED display, LCD display, etc. Conventional magnetic tape cartridges do not have a display for showing the status of the magnetic tape cartridge locally.

The display device 1502 may be used to provide guidance as to whether to mount or not mount the cartridge, the status of the leader pin, information received from the sensors, and/or any other available data derived from the cartridge. The display device may also help to indicate or locate a cartridge. This is particularly helpful where human users are prone to misreading barcodes on the cartridge.

An exemplary embodiment of the process of one embodiment of the invention may include the following operations. A movement sensor such as a tilt switch or other feasible sensor as described above may detect a fast horizontal movement generated by moving a magnetic tape cartridge from its current position in a magnetic tape library. A microcontroller in the cartridge, such as an ESP8266 controller or similar chip, may detect an output of the movement sensor indicating a shift in movement. The microcontroller may exit a deep sleep and/or low power consumption mode in response to detecting said tilt switch or sensor experiencing an external interrupt. Once the microcontroller leaves its deep sleep and/or low power consumption mode, the microcontroller may detect whether the magnetic tape leader pin is properly seated and report the status of the pin to a magnetic tape library controller. Based on this detection, the magnetic tape library controller may allow the placement of the cartridge in a magnetic tape drive when the magnetic tape leader pin is properly seated. If the magnetic leader pin is not properly seated, then the tape library controller may instruct the robot to place the magnetic tape cartridge into the tape library's IO station and/or output an error message for display to the operator to correct the seating of the magnetic tape leader pin. The microcontroller may then go back into a deep sleep and/or low power consumption mode. While one specific implementation of the process is described herein, it should be noted that the embodiments described herein may be implemented in the context of any type of media cartridge.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A data storage cartridge, comprising:
   a housing configured to house a data storage medium;
   a sensor coupled to the housing;
   a microcontroller coupled to the sensor, the microcontroller being configured to wirelessly communicate information about the sensor; and
   a mechanical write protect mechanism coupled to the housing of the data storage cartridge, wherein the sensor is configured to detect a status of the mechanical write protect mechanism.

2. A data storage cartridge as recited in claim 1, wherein the data storage medium is a magnetic recording tape.

3. A data storage cartridge, comprising:
   a housing configured to house a data storage medium therein;
   a cartridge memory coupled to the housing, the cartridge memory having a wireless communications interface;
   a microcontroller in physical communication with the cartridge memory, the microcontroller being configured to wirelessly communicate information retrieved from the cartridge memory;
   a mechanical write protect mechanism coupled to the housing of the data storage cartridge; and
   a sensor in communication with the microcontroller, wherein the sensor is configured to detect a status of the mechanical write protect mechanism.

4. A data storage cartridge as recited in claim 3, wherein the data storage medium is a magnetic recording tape.

5. A data storage cartridge, comprising:
   a housing configured to house a data storage medium therein;
   a mechanical write protect mechanism coupled to the housing of the data storage cartridge;
   an actuator coupled to the mechanical write protect mechanism for selectively changing a state of the mechanical write protect mechanism; and
   a microcontroller in communication with the actuator, the microcontroller being configured to control the actuator.

6. A data storage cartridge as recited in claim 5, wherein the data storage medium is a magnetic recording tape.

7. A data storage cartridge as recited in claim 5, comprising a sensor in communication with the microcontroller.

8. A data storage cartridge as recited in claim 5, comprising a display device in communication with the microcontroller.

* * * * *